United States Patent
Woods et al.

(10) Patent No.: US 10,000,145 B2
(45) Date of Patent: *Jun. 19, 2018

(54) AIR BAG SYSTEM FOR LIFTING TRAILER PLATFORMS

(71) Applicants: Mark Woods, Kingsburg, CA (US); Matthew Woods, Kingsburg, CA (US)

(72) Inventors: Mark Woods, Kingsburg, CA (US); Matthew Woods, Kingsburg, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/408,386

(22) Filed: Jan. 17, 2017

(65) Prior Publication Data

US 2017/0182922 A1      Jun. 29, 2017

Related U.S. Application Data

(63) Continuation of application No. 14/322,866, filed on Jul. 2, 2014, now Pat. No. 9,545,866.
(Continued)

(51) Int. Cl.
*B60P 1/43* (2006.01)
*F15B 15/10* (2006.01)

(52) U.S. Cl.
CPC .............. *B60P 1/433* (2013.01); *F15B 15/10* (2013.01)

(58) Field of Classification Search
CPC .. B60P 1/02; B60P 1/433; F15B 15/10; F15B 15/103
See application file for complete search history.

(56) References Cited

U.S. PATENT DOCUMENTS

| | | | |
|---|---|---|---|
| 3,054,522 A | | 9/1962 | James |
| 4,494,766 A | * | 1/1985 | McHugh ............ B60G 17/0523 280/444 |

(Continued)

FOREIGN PATENT DOCUMENTS

| | | | |
|---|---|---|---|
| EP | 2394848 | * 12/2011 | ................ B60P 1/02 |
| WO | 199212021 A1 | 7/1992 | |
| WO | 2006104663 A2 | 10/2006 | |

OTHER PUBLICATIONS

Gomes, C.J., and Rivers, D.F., Lift gate apparatus for a truck or trailer body, English Abstract of WIPO Patent Publication WO2006104663A2, Oct. 5, 2006, European Patent Organization, http://www.epo.org/searching/free/espacenet.html.

*Primary Examiner* — Saul Rodriguez
*Assistant Examiner* — Ashley K Romano
(74) *Attorney, Agent, or Firm* — William K. Nelson; Mark D. Miller

(57) ABSTRACT

The application discloses integrated air suspension and platform lifting systems that utilize an existing air supply for lifting one or more platforms installed in a trailer or hauling vehicle. An apparatus for lifting a rear gate or platform of a trailer or a hauling vehicle is disclosed that includes an actuating mechanism operable to pivot the platform between a lowered position (e.g., where the end of the platform is in contact with the ground) and a range of raised positions (e.g., where the platform is raised to meet an elevated platform such as a loading dock). The lifting mechanisms for raising and lowering the platform(s) may utilize a pressurized gas supply from a compressor. In some embodiments, the lifting mechanism may be supplied with pressurized air from a compressor of a brake system of a tractor. In some embodiments a separate locking mechanism is provided to hold the platform in place after the lifting system has moved it into a desired position.

34 Claims, 21 Drawing Sheets

Related U.S. Application Data

(60) Provisional application No. 62/019,398, filed on Jun. 30, 2014.

(56) References Cited

U.S. PATENT DOCUMENTS

| | | | |
|---|---|---|---|
| 4,498,836 A | 2/1985 | Love | |
| 4,943,204 A | 7/1990 | Ehrlich | |
| 6,199,876 B1 | 3/2001 | Eckelberry | |
| 6,394,734 B1* | 5/2002 | Landoll | B60P 1/433 280/149.2 |
| 7,497,494 B1* | 3/2009 | Good | B60P 1/433 14/71.3 |
| 7,806,647 B2 | 10/2010 | Gomes et al. | |
| 2007/0116546 A1* | 5/2007 | Dearing | B60P 1/6436 414/482 |
| 2008/0159839 A1 | 7/2008 | Gomes et al. | |
| 2013/0343931 A1* | 12/2013 | Wilson | B60C 23/003 417/410.1 |
| 2015/0034399 A1* | 2/2015 | Clayton | B62D 61/12 180/24.02 |

* cited by examiner

AIR BAG SYSTEM FOR LIFTING TRAILER PLATFORMS

This application is a continuation of U.S. patent application Ser. No. 14/322,866, filed on Jul. 2, 2014, which claims the benefit of U.S. Provisional Patent Application No. 62/019,398 filed on Jun. 30, 2014. Both U.S. patent application Ser. No. 14/322,866 and U.S. Provisional Patent Application No. 62/019,398 are incorporated herein by this reference in their entireties.

FIELD OF THE INVENTION

The present invention relates to air actuated platform lifting systems, and more particularly to improved air actuated trailer systems that include platform lifting apparatuses, and methods of using the same.

DISCUSSION OF THE BACKGROUND

Air suspensions and air brakes are widely used in the commercial trucking industry. These systems may be fed by pressurized air from the brake system of an attached tractor through a system of conduits and control valves. However, gate or rear platforms are typically lifted or pivoted by electric-over-hydraulic mechanisms, which have substantial drawbacks.

Rear platforms or lift gates on tractor trailers provide a mechanism for transporting loads on and off of the trailers. Conventional systems for lifting rear platforms may utilize pneumatic cylinders or a chain mechanism to provide the power to lift the platform. However, chain mechanisms require a driving motor and pneumatic cylinders cannot be provided with sufficient power from an air suspension and/or air brake system of a typical tractor to lift the rear platform, and thus also require a separate driving motor. These systems typically require the truck to be running to supply power to the driving motor, or the driving motor is powered by batteries tied into the electrical system of the tractor.

Such systems present distinct disadvantages including: 1) the risk that the batteries may die or lose charge (or the need to keep the truck running to supply power), 2) the batteries and/or driving motors add weight to the trailer; 3) extensive maintenance is generally required; 4) environmental contamination may be caused from hydraulic fluid leaks in such systems, and 5) the systems are expensive. With new regulations and environmental concerns, these existing systems are becoming less desirable, less reliable, and less effective. For example, multiple stops and uses of the batteries may drain them of charge, leaving the lift mechanisms inoperable, and local and state laws may prohibit idling of the truck and thus prevent the driver from recharging the auxiliary batteries during a stop. Thus, conventional lift mechanisms can fail under certain circumstances.

It is therefore desirable to provide improved lifting and positioning systems for trailer platforms and trailer systems. The present invention provides such apparatuses and methods of using the same, while at the same time accomplishing many of the desirable conditions described below.

SUMMARY OF THE INVENTION

Embodiments of the present invention provide air-actuated lifting systems for tractor trailers that are operable to position one or more platforms, and that are powered by pressurized fluid (usually but not necessarily air) provided from a compressor in the braking system of an attached tractor, and methods of using or operating the same.

Large commercial hauling tractors and trailers currently utilize air brake and air suspension systems due to their superior safety and efficiency. Such air brakes provide a fail-safe system in which the brakes of the vehicle and/or an attached trailer engage in the case of the brake system failing (in contrast to hydraulic brake systems in which the brakes may fail to engage if fluid or pressure is lost from the system). Additionally, air suspension systems offer improvements over steel spring suspensions, including the ability to lower the trailer for loading purposes, less wear and tear on the tractors and trailers, a smoother ride resulting in more comfort for the driver and less damage to cargo hauled on the trailer, improved load equalization between the axles allowing the load to be maximized to the legal limits, and less load shifting during hauling.

The air brake system of a tractor typically includes a compressor for supplying pressurized air to power the air brake system. The compressor may provide a source of pressurized air through the trailer supply and trailer service lines that connect the air brake system of the tractor to the air brake and air suspension systems of the trailer, and may charge air supply tank(s) for the air brakes and suspension systems of the trailer. As discussed herein, the pressurized air system of the tractor trailer combination may be utilized for driving additional mechanisms, including the lifting systems of the present invention.

Generally, embodiments of the present invention are directed to integrated fluid-actuated systems that are adapted to use existing air brake systems to operate a platform lifting system utilizing an existing pressurized air supply provided by an attached truck/tractor. Generally, the systems of the present invention use air from a compressor of an attached truck or tractor, but in some embodiments other fluids may be utilized, such as other gases (e.g., nitrogen gas, carbon dioxide, etc.). The platform lifting system may be utilized to lift or pivot a platform installed in a trailer to multiple positions, in order to raise and lower items to be loaded or unloaded from the trailer. The integrated air-actuated systems of the present invention may include multiple platform lifting apparatuses, each for lifting or pivoting a separate platform. As an example, and without limiting the invention, a platform lifting apparatus may be coupled to a rear gate or platform and may be operable to pivot the platform between a lowered position (e.g., where the end of the platform is in contact with the ground) and a range of raised positions (e.g., where the platform is raised to meet an elevated platform such as a loading dock, or the platform is raised to a horizontal positioned to extend the usable length of the trailer, etc.). The lifting mechanism for raising the platform(s) may utilize a pressurized air supply from the compressor of an attached tractor (e.g., a truck or tractor to which the trailer is hitched for towing). Embodiments of the present invention provide cost effective and efficient mechanisms for raising platforms on a trailer without the need for a separate hydraulic system or an additional motor or batteries.

Embodiments of the platform-lifting systems of the present invention utilize pressurized air to inflate airbags located under a platform to lift and/or pivot the platform. In some embodiments, the present invention includes a platform lifting unit coupled to a rear platform assembly of a hauling trailer, where the platform lifting unit includes one or more air bags that are positioned below the platform and are capable of raising and lowering the rear platform as it pivots on an axle connected to the distal end of a trailer. The one or more air bags may be supplied with air from an air supply tank, which may be charged with air by the air brake system of an attached truck or tractor. Such air bag(s) may be positioned at a specific distance from a pivot axle at the distal end of the trailer to allow (1) the airbag(s) to apply enough torque to the rear platform to lift the platform and, in some cases, a load thereon, and to allow (2) the rear platform to be lowered to a point where the distal end of the rear platform can meet the ground. The platform lifting system may be used to position the rear platform at any suitable height, such as level with a loading dock, or into a horizontal position for extending the useful length of the trailer, or to any other desirable height.

The integrated air actuated systems of the present invention may include one or more additional pressure tanks for storing pressurized air to accommodate the one or more platform lifting systems. A control valve may be positioned between the one or more additional pressure tanks and the one or more platform lifting systems, allowing a human operator to control the movement of air from the one or more additional tanks to the one or more air bags of the platform lifting systems, and thereby control the position of the platforms coupled to the platform lifting systems. The control valves may be manually controlled (e.g., push-pull valves) or they may be controlled through an electronic control system that may include electronic actuators that open and close the control valve.

The rear platform positioning systems may additionally include a position locking system that is actuated after the rear platform has been moved into a desired or pre-determined position. After the one or more air bags have been used to position the platform, the position locking system may allow the pressure in the air bag(s) to be released or partially released, while maintaining the platform in position. The position locking system may include rigid support bars that are adjustably positioned under the rear platform which hold the platform in place while the trailer is being hauled, and which may be used to hold the platform at a given position during loading or unloading of the trailer. The position locking system alleviates the need to keep the air bags fully inflated during hauling, loading or unloading, which would otherwise require the compressor to continue working to supply air to the pressure tanks and to the rear platform air bag(s) to keep them inflated. In some embodiments, the airbags may remain inflated at a reduced pressure after the platform is raised to a desired position in order to dampen or prevent movement or shaking of the platform while the tractor trailer is moving. Thus, the position retaining system improves the efficiency of the current rear platform positioning system.

Embodiments of the present invention also encompass novel trailer systems that include multiple airbag-actuated platforms, each of which is indirectly fed with pressurized air from the compressor of an attached tractor. Different trailer designs may benefit from multiple platforms to extend the useful length of the trailer, in addition to the increased efficiency of an air bag-actuated rear platform. For example, in one embodiment, the invention may be drawn to a stepdeck-style trailer that includes (1) a rear platform that is positioned by air bags, and (2) a front end platform that is embedded in the lower deck of the trailer and that can be lifted at its proximal end by air bags to meet the upper deck of the trailer. The front end platform and the rear platform allow an operator to extend the usable length of the trailer. For example, an additional vehicle may be positioned at the meeting of the upper deck and the raised front end platform, whereas the vehicle would not fit without the raised front end platform. Such trailer systems may include position locking systems for each air bag-actuated platform to hold each platform in a desired position after the air bags have raised the platform.

The platform lifting systems and trailer systems disclosed herein may provide trailers and hauling vehicles that are lighter and requires less energy and maintenance than conventional hauling trailers. Embodiments of the present invention thus enable trucking operations to more economically and efficiently transport loads because of the reduced weight of the trailer (allowing more cargo to be towed within the weight limit of the tractor), the extension of the trailer by raising the platform (allowing more cargo to be loaded on a trailer of standard length), and the elimination of extra motors or hydraulic systems to drive a gate or rear platform lifting system.

In one aspect, the present invention relates to an apparatus for positioning a platform of a hauling vehicle including a control valve connected to a source of pressurized fluid, a conduit having a proximal end for connecting to the control valve, at least one airbag for lifting a platform, where the at least one airbag may be connected to the conduit, and may be positioned under the platform, and the platform may be hingedly attached to the hauling vehicle such that the platform pivots as the at least one airbag inflates or deflates, and a locking mechanism for holding the platform in a pre-determined position after the at least one airbag moves the platform to the pre-determined position. In the context of the present application, the term "hauling vehicle" may mean a tractor, a truck, a hauling trailer, mobile farming equipment, or other mobile vehicle or trailer.

In a second aspect, the present invention relates to an apparatus for operating a movable platform of a vehicle or trailer that includes at least one airbag positioned below the platform, an external source of pressurized fluid in communication with at least one fluid storage tank, a fluid conduit connected at one end to one of the at least one fluid storage tank and connected at an opposite end to at least one airbag, and a control valve on the conduit for controlling the flow of fluid from the tank to the at least one airbag for moving the platform upward or downward as the airbag is inflated or deflated. The external source of pressurized fluid may be a truck or tractor air compressor. The apparatus may also include at least two storage tanks for storing a pressurized fluid, at least one connecting conduit provided in series between each of the tanks, and a check valve provided on each connecting conduit. The last of the series of fluid storage tanks may be connected to the conduit, and another of the fluid storage tanks may be connected to an air brake system of the vehicle or trailer.

In a third aspect, the present invention relates to an integrated trailer suspension and platform lifting system for a tractor trailer including at least one storage tank for storing a pressurized fluid, a delivery conduit system attached at a first end to an extrinsic air supply and attached at a second end to the at least one storage tank, an auxiliary tank connected to said at least one storage tank by a check valve, at least one rear platform airbag for lifting a rear platform of a trailer, the at least one rear platform airbag connected to the auxiliary tank by a rear platform conduit, where the at least one rear platform airbag is positioned under the rear platform, and a control valve for controlling the flow of a pressurized fluid from the auxiliary tank to the at least one airbag.

In a fourth aspect, the present invention relates to methods of raising a rear platform of a trailer, including pumping a fluid into an auxiliary tank of an integrated air suspension and platform lifting system from an extrinsic source of pressurized fluid, opening a control valve to pass the fluid from the auxiliary tank into a conduit system, through which the fluid passes to at least one airbag, the airbag positioned below a rear platform of the trailer, lifting the rear platform as the at least one airbag fills with the fluid, and/or lowering the airbag as fluid escapes from it. The methods may include closing the control valve when the at least one airbag is filled with said fluid, where the integrated air suspension and brake system may include a control unit operable to open and close said control valve to inflate and deflate the at least one airbag. The methods may also include opening a second control valve to pass the fluid to at least one front-end platform airbag to fill the front-end platform airbag with fluid. Passing the fluid to the at least one front-end platform airbag may raise a front-end platform.

It is therefore an object of the present invention to provide an air-actuated system for lifting a platform of a trailer.

It is an additional object of the present invention to provide an actuating system for lifting a platform of a trailer that can be operated using air provided by a tractor air brake system without the need for added power or an added actuating system (e.g., an auxiliary pump and/or motor).

It is an additional object of the present invention to provide both rear and forward platforms that extend the usable area of a trailer, where the movement of both the rear and forward platforms are controlled by an air-actuated system.

It is an additional object of the present invention to provide a system for lifting a rear platform of a trailer that does not use a hydraulic system. As a result, there is no chance of a hydraulic fluid spill, or the need to handle and/or dispose of hydraulic fluid.

It is an additional object of the present invention to provide a lightweight and energy efficient air-actuated system for positioning multiple platforms on a trailer.

Embodiments of the present invention advantageously utilize efficient air-actuated systems that can accommodate considerable loads. In addition, embodiments of the present apparatus do not interfere with the operation of the air brake or air suspension systems of the trailer.

Additional objects of the invention will be apparent from the detailed descriptions and the claims herein.

BRIEF DESCRIPTION OF THE DRAWINGS

FIG. 2I is a side view of a platform lifting apparatus of an integrated fluid-actuated system according to an embodiment of the present invention, showing a platform in a raised position.

DETAILED DESCRIPTION

Figure 1A:
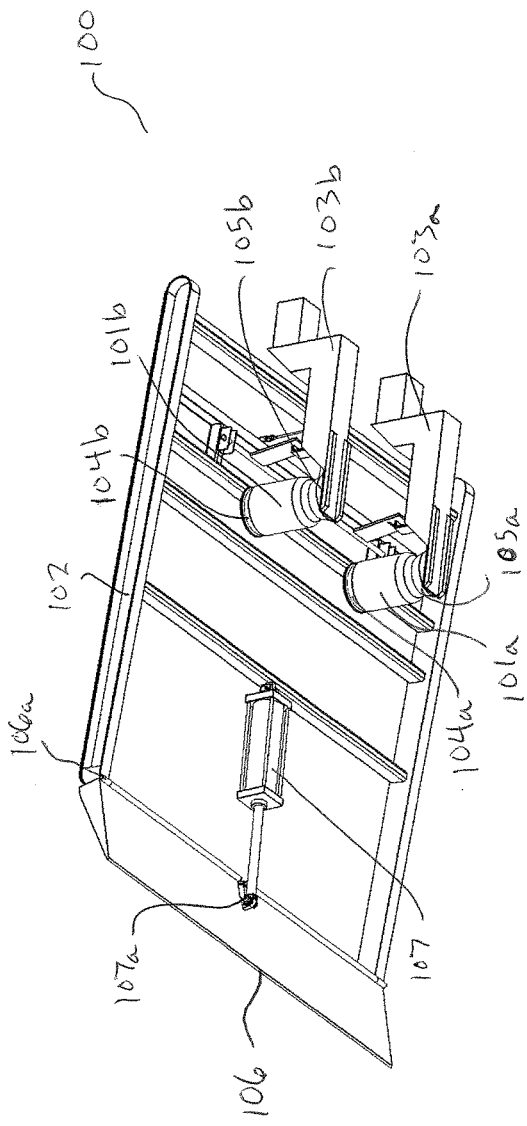
FIG. 1A is a perspective view of a platform lifting apparatus according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

Referring to the drawings wherein like reference characters designate like or corresponding parts throughout the several views, and referring particularly to FIGS. 1A-1K, it is seen that the present invention includes various embodiments of a platform-lifting system that may be actuated by air bags. Certain embodiments of the present invention relate to a hauling trailer that includes an integrated air-actuated system that may include one or both of an air brake system and an air suspension system, and at least one platform lifting system (see, e.g., FIGS. 2A-2L).

The embodiments of the platform lifting system of the present invention may include one or more airbags positioned under a pivoting platform that is connected to a larger trailer or truck structure for hauling various items (e.g., cars, equipment, building materials, etc.). The one or more airbags may be supplied with a pressurized air from an air supplying system connected to the one or more airbags. The platform lifting system may be integrated into an air brake and/or air suspension system of a vehicle or trailer, such that the one or more airbags of the system are provided with air from the vehicle without the need for an additional motor or power source. The airbags may be installed on the underside of the platform at a position that generates sufficient torque to lift the platform and a load thereon. The one or more airbags may also be anchored to a stationary support bracket or member located beneath the one or more airbags for providing a surface that functions as a stationary base for the airbags. The filling of the airbags with pressurized air may be controlled by a human operator using manual controls or an electronic control system having a user interface. The platform lifting system may additionally have mechanical position retaining structures that can be engaged with the platform once the platform has been moved into a desired position by the one or more airbags. For example, heavy steel beams or brackets may be positioned under the platform, once it is a desired position to support heavy loads that may be positioned on the platform.

The present invention also encompasses an innovative trailer system that may include one or more platform lifting systems. The trailer system may have an integrated air-actuated system that may include one or both of an air brake system and an air suspension system, as wells as one or more platform lifting systems. The platform lifting systems within the trailer system may be positioned such that they can extend the usable length of the trailer. For example, the trailer system may include a rear platform lifting system for positioning the rear platform in a horizontal position and/or other positions for extending the end of the trailer.

Platform Lifting Systems

Some embodiments of the present invention are drawn to a platform lifting system for moving a pivoting platform to multiple positions. The platform lifting apparatus may raise and lower an end of the platform opposite a pivoting end of the platform to place the platform at various positions (e.g., a horizontal position for extending the useful length of the trailer, a position above the horizontal for meeting a loading dock, or to any other desirable height). The platform lifting apparatus of the present invention may be connected to an air brake and/or air suspension system of a large vehicle having such systems as an integral or added system, such a commercial hauling tractor, a van (e.g., a large moving van), large farm equipment, etc.

In some embodiments, the platform lifting apparatus may be installed to lift a rear platform of a hauling trailer or truck bed. The lifting apparatus may include one or more air bags, which may have a design that allows the airbags to withstand high internal pressures and to apply pressure upward against a platform when they are inflated, like a linear actuator. The air bags may include an elastomeric flexible member (the inflatable portion) that is connected at each end to a rigid plate (e.g., a metal plate) with an air tight seal capable of withstanding high pressures (e.g., and without limitation, pressures up to about 160 PSI). The elastomeric member of the air bag may be made from a rubber and fabric combination that may be calendered together to form strong resilient material.

The airbags may have a shape that allows the air bags to act as a linear actuator, applying force upward against a bottom side of a platform. For example, and without limitation, the airbags may have a cylindrical shape wherein the base plate of the cylindrical airbag may be anchored to a stationary support member and the top plate of the cylindrical airbag may be attached to the bottom of the platform. In other implementations, and without limitation, the airbags may have the shape of a frustrum of a cone (e.g., a tapered sleeve shape), a structure having multiple stacked, ring-like, connected segments (e.g., a bellows structure with multiple convolutions), or other shapes that would be effective to apply force in a linear direction, allowing the airbag to function as a linear actuator.

Figure 1B:
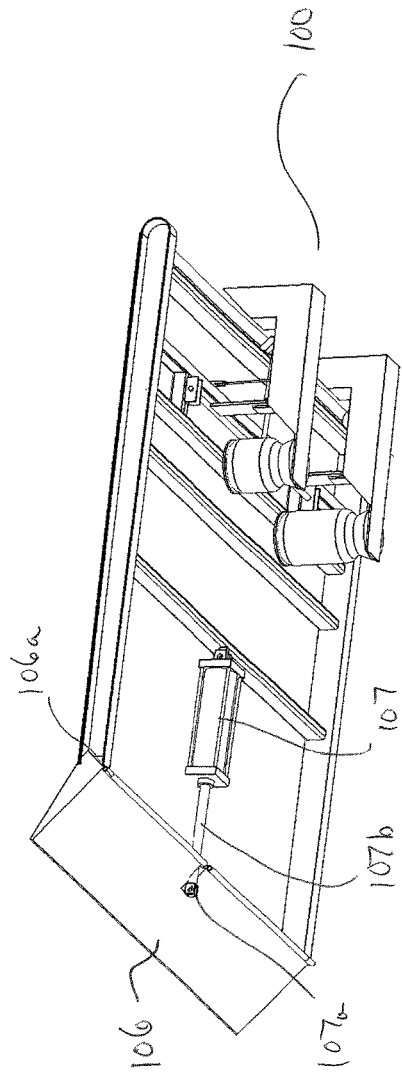
FIG. 1B is a bottom view of a platform lifting apparatus according to an embodiment of the present invention.

As an example, and without limitation, FIGS. 1A-1B show a platform lifting apparatus 100 having two air bags 101a and 101b aligned side-by-side under a platform 102. The top plates 104a and 104b of the airbags 101a and 101b may be anchored to a cross beam or other structure in the bottom side of the platform 102 (see, e.g., FIG. 1B). For example, the top plates may be attached to the platform by bolts or other fasteners. The platform lifting apparatus 100 also includes stationary support members 103a and 103b, to which the bottom plates 105a and 105b of airbags 101a and 102b may be attached (e.g., by bolts or other fasteners). The stationary support members 103a and 103b may be anchored to a frame or other stable structure on the underside or rear of a tractor, truck, or trailer. The stationary support members function to provide a stable surface from which the airbags can rise and apply force to the platform and thereby lift the platform.

In some implementations, the platform lifting system of the present invention may be used to raise a platform having a distal ramp. For example, and without limitation, the platform to which the platform lifting system is coupled may be a rear platform or gate of a hauling trailer that is designed to be lowered to the ground and/or to be raised to meet a loading dock. In such implementations, the platform lifting system may include an actuator (e.g., a linear actuator) for extending and retracting such a ramp. The actuator may also be used to keep the distal ramp pressed into the raised position (e.g., during hauling) to provide a bumper for preventing cargo from rolling or slipping off of the ramp, or it be used to retract the distal ramp under the platform to prevent the distal ramp from flopping or rattling during motion. Without limiting the invention, FIG. 1A shows a platform 102 having a distal ramp 106, which is attached by a hinge 106a to the distal end of the platform 102. The exemplary platform lifting system of FIG. 1A includes a distal ramp actuator 107 that is connected to the distal ramp 106 by a pivoting joint 107a. The linear actuator 107 may be operable to pivot the distal ramp 106 up and down on hinge 106a. To illustrate, FIG. 1B shows the distal ramp 106 in the raised position as a result of the extension of the linear actuator rod 107*b* of linear actuator 107.

The operation of the platform lifting apparatus is driven by pressurized air provided by an extrinsic system (e.g., the air compressor of tractor or truck) that may be connected to the platform lifting apparatus through air supply lines. The passage of air from the extrinsic air supply system may be controlled by a set of valves (not shown) that control the flow of air through the air supply lines. In some implementations, and without limitation, the valves may be controlled by manual valve controls (e.g., push-pull valves, or other types of manual valve). In other implementations, and without limitation, the valves may be controlled electronically by a processing unit (not shown), which may include a user interface to allow an operator to input commands to open or close each of the control valves.

Figure 1C:
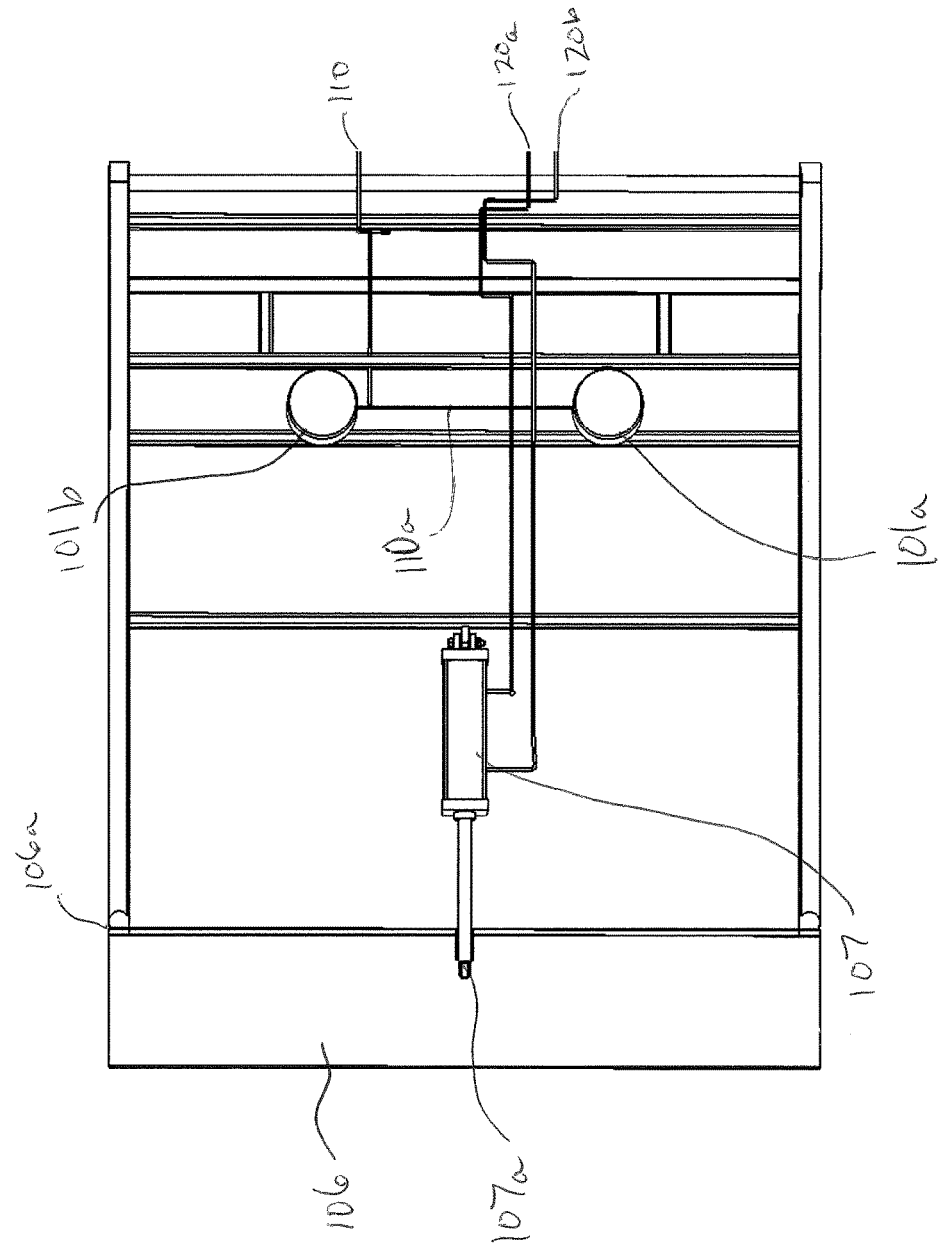
FIG. 1C is a perspective view of a platform lifting apparatus according to an embodiment of the present invention, where a distal ramp of the platform is raised.

As an example, and without limitation, FIG. 1C shows the airbag supply conduit 110 for supplying air to airbags 101*a* and 101*b*. The airbag supply conduit 110 splits at "T" conduit 110*a*, which directly connects to the airbags 101*a* and 101*b*. The "T" conduit 110*a* may connect at a connection valve on each of the top plates 104*a* and 104*b*. In other implementations, the connection valve may be placed at another location on the airbags, such as the bottom plates. The proximal end of the airbag supply conduit may be connected to a control valve, which in turn may be connected to a supply conduit from an extrinsic pressurized air supply.

The platform raising apparatus may also include air supply conduits that provide pressurized gas to the actuator connected to the distal ramp. The actuator may be a linear dual actuator system capable applying force to the piston rod of the actuator in both directions (the actuator may be capable of "pushing" and "pulling"). In such dual actuator systems, the actuator may have a chamber on either side of a piston such that the piston and an attached piston rod can be moved in either direction depending on the chamber to which pressure is added. When pressure is increased on the proximal side of the piston (in the proximal chamber), the piston is forced distally and extends the piston rod. When pressure is increased on the distal side (in the distal chamber) the piston is forced proximally and retracts the piston rod. In other embodiments, and without limitation, the actuator may be single directional actuator system that applies force only in the extending direction (the actuator may be capable of pushing), in which case the distal ramp may be lowered by releasing air pressure applied to the actuator. Depending on whether linear actuator is a single directional or dual directional actuator, the platform lifting apparatus may have one or more air supplying conduits providing pressurized air to the linear actuator.

As an example, and without limitation, a platform lifting apparatus 100, such as that shown in FIG. 1C, includes actuator supply conduits 120*a* and 120*b* for providing a pressurized air to the distal ramp actuator 107 for positioning the distal ramp 106. In the exemplary lifting apparatus 100, the distal ramp actuator is a dual directional actuator. The actuator supply conduit 120*a* may supply pressurized air to a proximal chamber of the distal ramp actuator 107, and the actuator supply conduit 120*b* may supply pressurized air to a distal chamber of the distal ramp actuator 107. The proximal chamber may drive the piston outward to extend the piston rod and the distal chamber may drive the piston inward to retract the piston rod. The actuator supply conduits may be connected to control valves that are supplied with pressurized air from the extrinsic air supply system. The passage of air from the extrinsic air supply system may be controlled by a set of manual or electronically controlled valves (not shown).

The platform lifting apparatus of the present invention may include some additional mechanisms and functionality that may be used to control the position of the platform. In some embodiments, the platform lifting apparatus may include a platform position locking system for holding the position of the platform once the airbags have lifted the platform into a raised position (e.g., a horizontal or substantially horizontal position). The position locking system may include one or more mechanically actuated support members that may be positioned under the platform when the platform is in a raised position. In some embodiments, and without limitation, the support members may be rigid (e.g., metal) beams or bars that may be extended (e.g., horizontally or substantially horizontally) under platform by a linear actuator (the locking system actuator) to thereby support platform. In other embodiments, and without limitation, rigid bars may be rotated from the platform to engage the stationary support members below the platform (e.g., those of a platform lifting apparatus) to prop the platform in the raised position.

In further embodiments, the position locking system may include bilateral vertically oriented bars (e.g., curved bars) on the bottom of the platform that include multiple slots therein for receiving a rigid beam or bar extended from one of the mechanically actuated support member. The multiple slots in the vertically oriented bars may allow the platform to be supported at various heights and positions. In other embodiments, the platform system may include a releasable ratcheting system that engages as the platform is lifted. The support provided by the ratcheting system may be released by a manual or electronically engaged release mechanism.

Figure 1D:
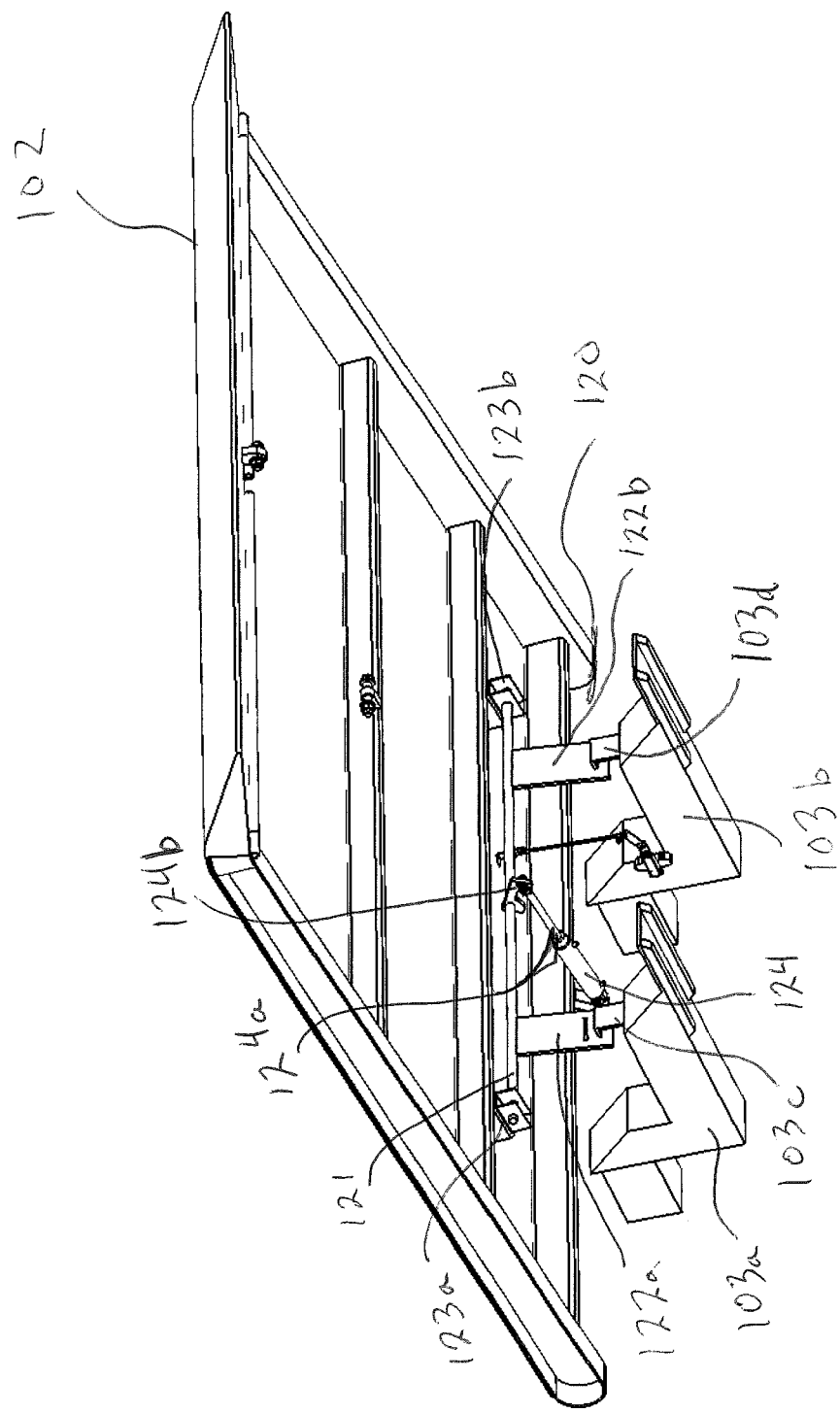
FIG. 1D is a perspective view of a platform lifting apparatus according to an embodiment of the present invention showing the position locking mechanism.
Figure 1E:
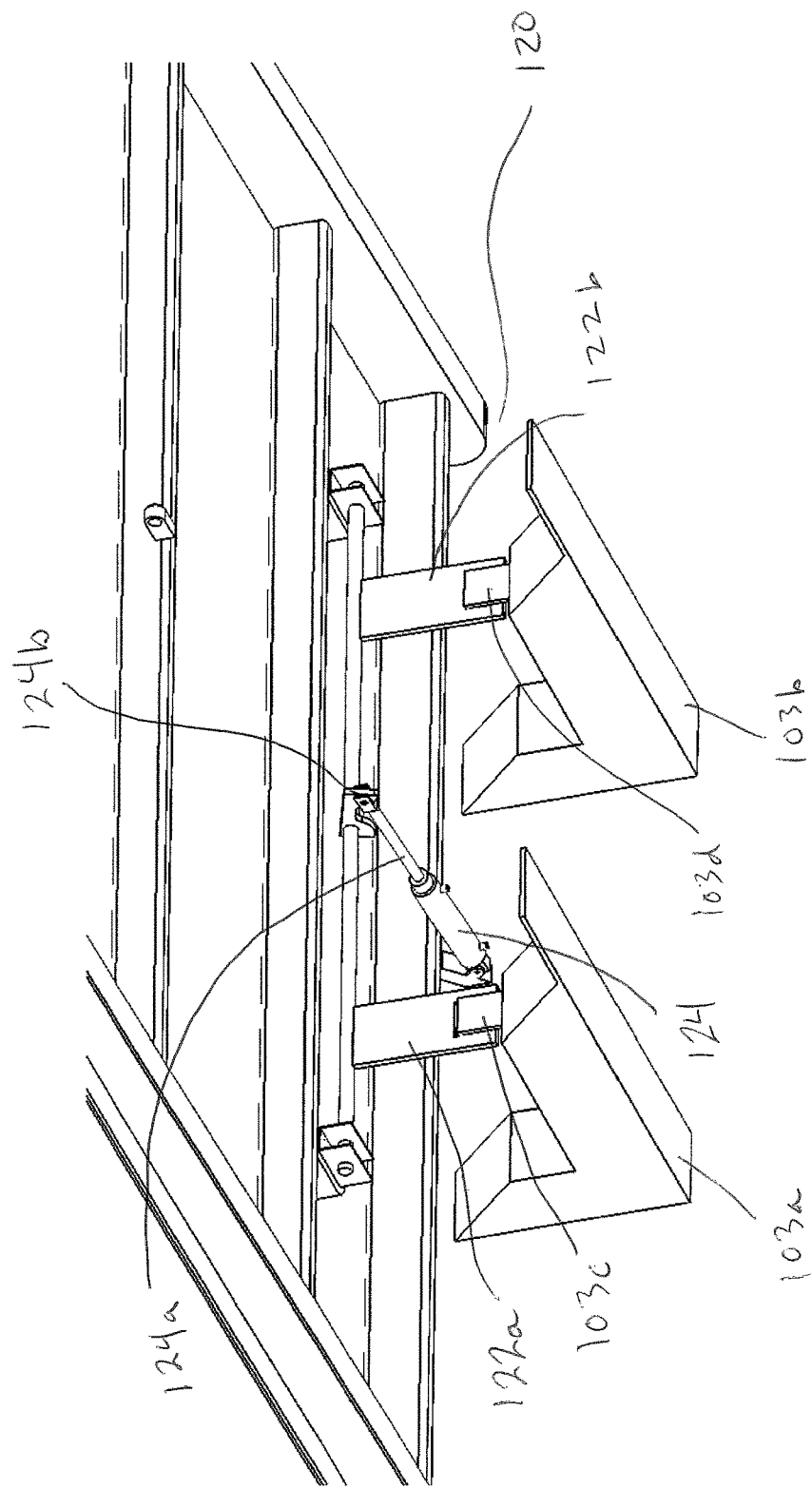
FIG. 1E is a close-up perspective view of a platform lifting apparatus according to an embodiment of the present invention, showing the position locking mechanism in the locked position.

Without limiting the invention, FIG. 1D shows an embodiment of a platform lifting apparatus 100 with the addition of position locking system 120. Other structures (airbags 101*a* and 101*b*, the distal ramp actuator 107, the air supplying conduits, etc.) of the platform lifting apparatus 100 have been omitted from FIG. 1D for the sake of clarity, although they are present in this embodiment. The position locking system 120 may include an axle 121 connected to locking bars 122*a* and 122*b*. The locking bars 122*a* and 122*b* may have slots therein for receiving support brackets 103*c* and 103*d* on stationary support members 103*a* and 103*b*. The axle 121 may be suspended by axle support brackets 123*a* and 123*b*, which couple the axle 121 to the platform 102. The axle may be rotated by a locking system actuator 124 having a piston rod 124*a*, which may be attached to the axle 121 by a pivoting joint 124*b*. When the piston rod 124*a* is in a retracted position, the axle 121 may be rotated toward the locking system actuator 124 and the locking bars 122*a* and 122*b* may be rotated such that they are about parallel with the platform 102 and nested within the bottom of the platform 102. As shown in FIG. 1D, when the piston rod 124*a* is extended, the axle may be rotated away from the locking system actuator 124 and the locking bars 122*a* and 122*b* may be dropped down from the platform 102 such that the slots in the locking bars 122*a* and 122*b* may engage with the support brackets 103*c* and 103*d*. FIG. 1E shows a close up view of the position locking system 120 where the piston rod 124*a* is fully extended rotating the axle 121 sufficiently to position the slots in the locking bars 122*a* and 122*b* such that they are fully engaged with the support brackets 103*c* and 103*d*. In this condition, the locking bars 122*a* and 122*b* may support the weight of the platform 102 and a substantial load placed upon the platform (e.g., an automobile or other heavy load), and the airbags may not need to be maintained in an inflated condition in order to keep the platform in the raised position (e.g., horizontal or substantially horizontal). In some embodiments, the airbags may remain inflated at a reduced pressure after the platform is raised to a desired position in order to dampen or prevent movement or shaking of the platform while the tractor trailer is moving.

The locking system actuator of position locking system may be powered by pressurized air provided by the extrinsic air supply system. The locking system actuator may be a linear dual directional actuator, which would enable the locking system actuator to hold the locking bars securely when they are in the locking position and when they are in the retracted position. In such implementations, the actuator may have a proximal chamber that drives the piston outward to extend the piston rod and a distal chamber that drives the piston inward and retracts the piston rod. In some implementations, and without limitation, the locking system actuator may have a separate control valve and air supplying lines. In other implementations, the locking system actuator may be connected to and controlled by the same control valves as the distal ramp actuator of the platform lifting system. The combination of the distal ramp actuator and the locking system actuator on the same air supply circuit is functional and efficient for some applications because once the airbags have raised the platform into position, the locking bars can be lowered and the distal ramp can be retracted at the same time by opening a single control valve. It is to be appreciated that a linear actuator may be used in other implementations of locking apparatus. For example and without limitation, a retractable actuator rod may be inserted into (and retracted from) any of a number of pre-positioned side openings to hold the platform in place according to the position of the selected side opening.

Figure 1F:
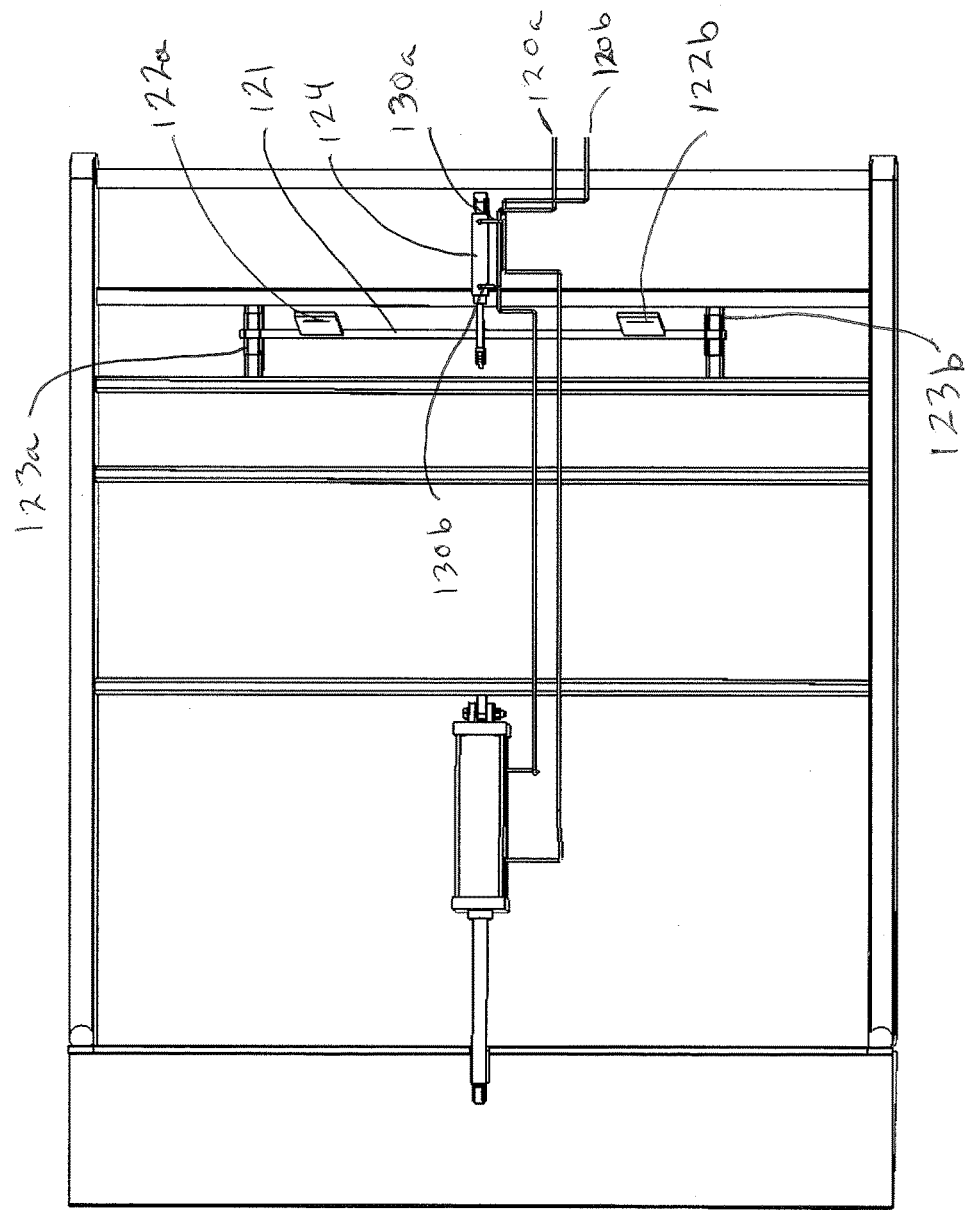
FIG. 1F is a bottom view of a platform lifting apparatus according to an embodiment of the present invention, emphasizing the locking mechanism actuator and the distal ramp actuator.

Without limiting the invention, FIG. 1F shows distal ramp actuator supply lines 120a and 120b for providing a pressurized air to the distal ramp actuator 107 and locking system actuator supply lines 130a and 130b that branch off of the distal ramp actuator supply lines 120a and 120b, respectively, and connect to the locking mechanism actuator 124. Other structures (e.g., airbags 101a and 101b, stationary support structures 103a and 103b, airbag supply conduit 110, etc.) of the platform lifting apparatus 100 have been omitted from FIG. 1F for the sake clarity, although they are present in this embodiment. The locking mechanism actuator 124 may be a linear dual directional actuator system, and the supply lines 130a and 130b may supply pressurized air to separate chambers of the actuator 124 to enable the application of force by the actuator 124 in both linear directions.

The position locking system of the platform lifting system may include additional features such as locking pins that may be slotted into the support brackets to retain the locking bars in position on the support brackets after the locking bars have been engaged with the support brackets. In other implementations, and without limitation, the linear actuator may have a locking pin or other locking mechanism that locks the piston rod into the extended position to prevent the axle from rotating and allowing the locking bars to move from their positions on the support brackets.

The platform lifting apparatus may further include a height control valve for controlling how high the platform may be raised by the airbags. The height control valve may be a lever actuated pressure relief valve, having a lever connected to a bottom of the platform by a bar or chain. The height control valve body may be connected to one of the stationary support structures or other stationary structure such that it does not move with the platform, and the lever may be pulled upward as the platform is raised by the airbags. During operation of the airbags, height control valve may remain closed until the platform is raised above a desired, predetermined position (e.g., horizontal, substantially horizontal, etc.), at which point the valve opens. The height control valve may be calibrated such that it is set to open when the platform is raised beyond the pre-determined height. In other embodiments, and without limitation, the height control valve may have a different mode of function. For example, the height control valve may be electronically opened when signaled by a separate sensor that is configured to open the height control valve when the platform moves above the pre-determined height (e.g., an optical sensor, a pressure sensor, a magnetic sensor, etc.).

Figure 1G:
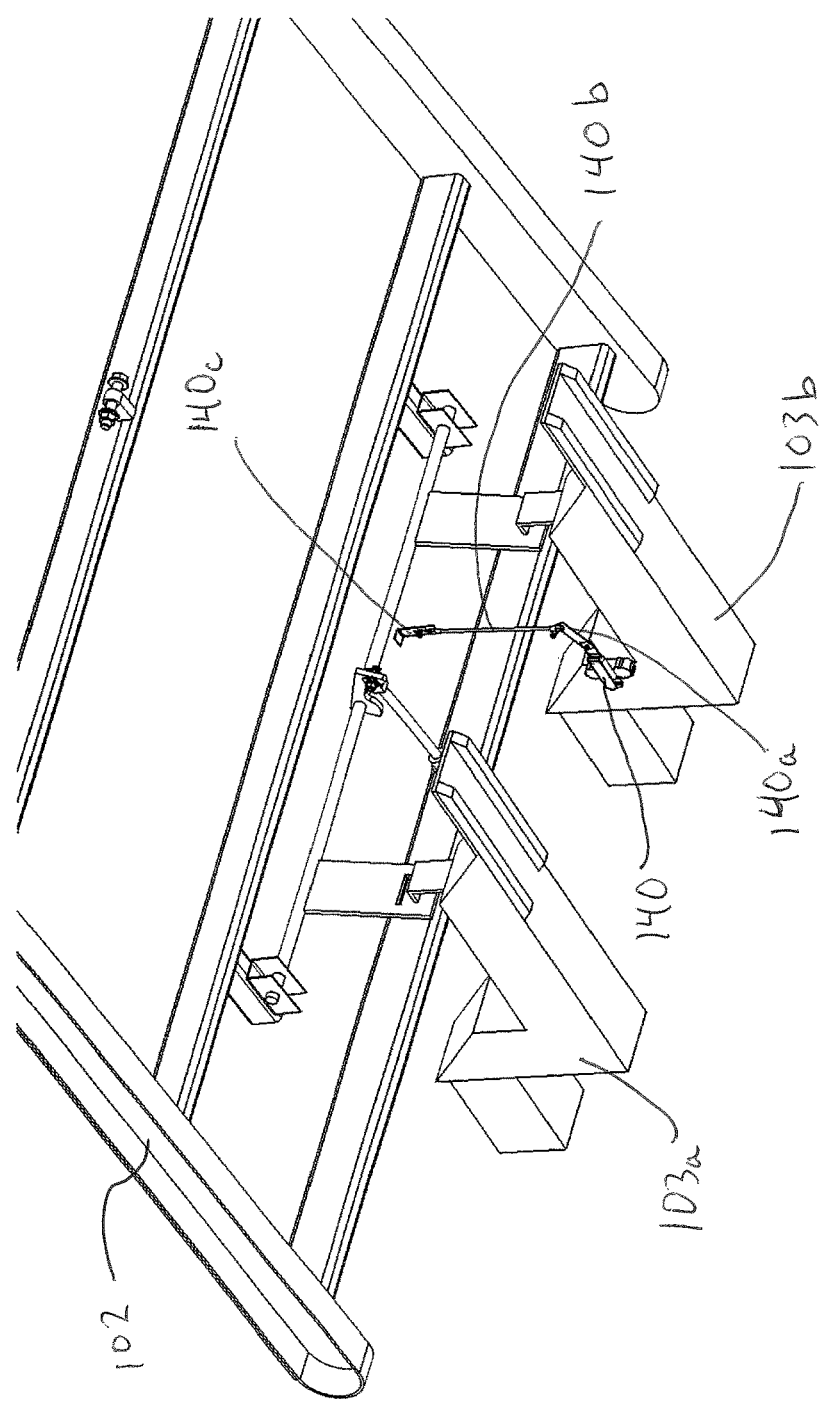
FIG. 1G is a perspective view of a platform lifting apparatus according to an embodiment of the present invention showing the position locking mechanism, emphasizing the height control valve of the platform lifting apparatus.

Without limiting the invention, FIG. 1G shows a close up view of the underside of the platform 102, and includes the height control valve 140. Other structures (e.g., airbags 101a and 101b) of the platform lifting apparatus 100 have been omitted from FIG. 1D for the sake of clarity, although they are present in this embodiment. The height control valve 140 is attached to the stationary support member 103b, and thus remains stationary when the platform 102 is lifted into a raised position by the airbags. The height control valve 140 includes a lever 140a that is connected to a bar 140b, which is in turn anchored to the bottom side of the platform 102 by connecting bracket 140c. The connection between the bar 140b and the connecting bracket 140c, as well as the connection between the bar 140b and the lever 140a, may be pivoting joints that allow the bar to pivot and rotate through the joints as the platform 102 is raised. Once the lever 140a is pulled upward by the bar 140b to a threshold point (e.g., corresponding to the platform being raised above a horizontal position), the height control valve 140 may open and allow air to escape from the height control valve 140 and thereby lower the level of airbags and the platform 102.

Figure 1H:
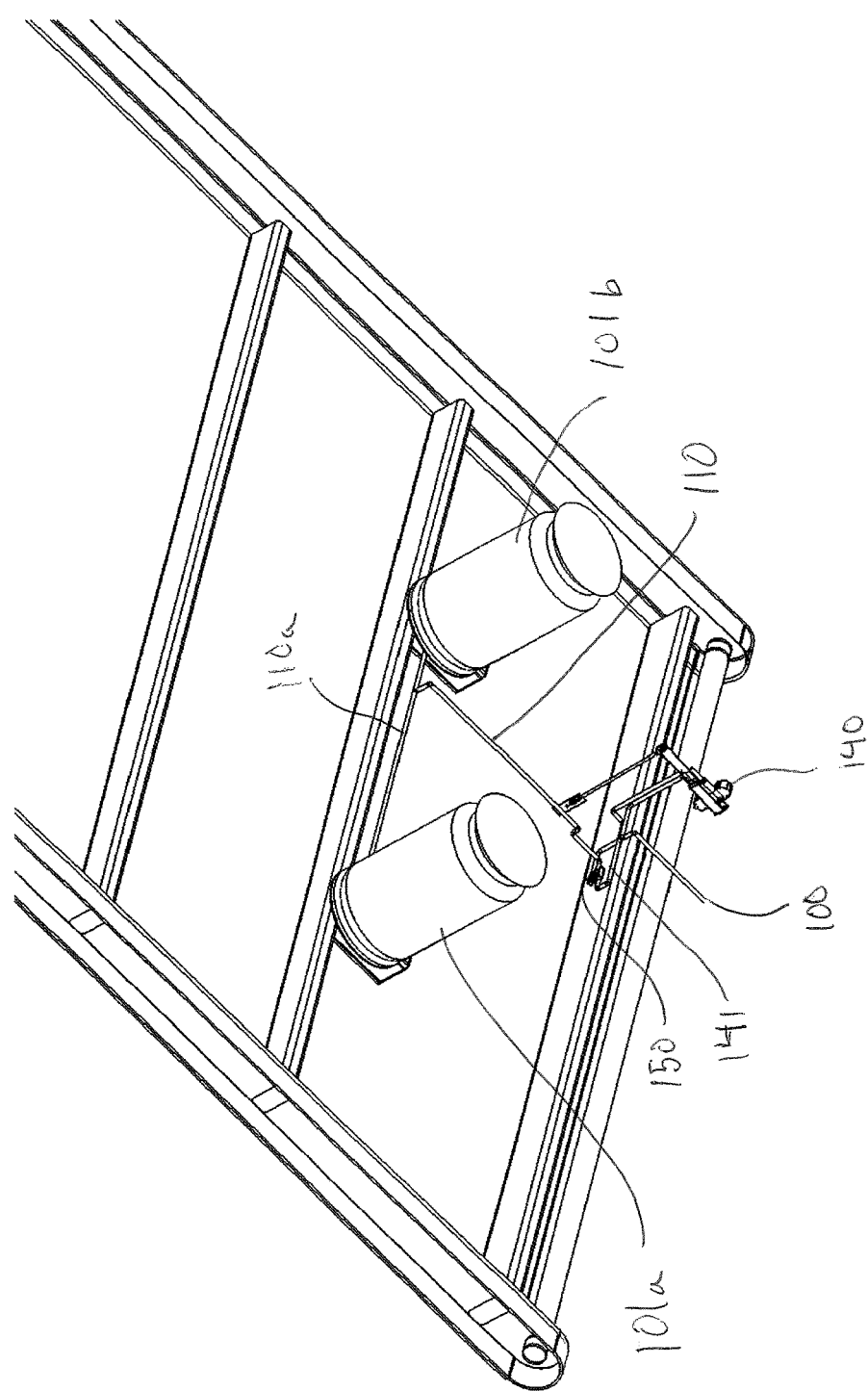
FIG. 1H is a perspective view of a platform lifting apparatus according to an embodiment of the present invention showing the position locking mechanism, emphasizing the airbags and the fluid supply conduits.

The height control valve may be connected to the airbag supply conduit via an air conduit coupling manifold. Thus, when the height control valve is opened, the air and pressure from the airbag supply conduit may be released through the height control valve, thereby lowering the air volumes within the airbags and the height of the platform. Without limiting the invention, FIG. 1H shows the airbag air supply conduit 110 connecting to air supply line coupling manifold 150, and control height valve connection line 141 connecting the coupling manifold 150 to the control height valve 141. When the control height valve 140 opens, air is released and drawn from the airbags 101a and 101b through the coupling manifold 150 to be released by the control height valve 140. It should be noted that several structures of the platform lifting apparatus have been omitted from the FIG. 1H for the sake of clarity, although they are present in this embodiment, including the stationary support members, the position locking system, the distal ramp system, and the conduits that connect to the position locking system and the distal ramp system.

Figure 1I:
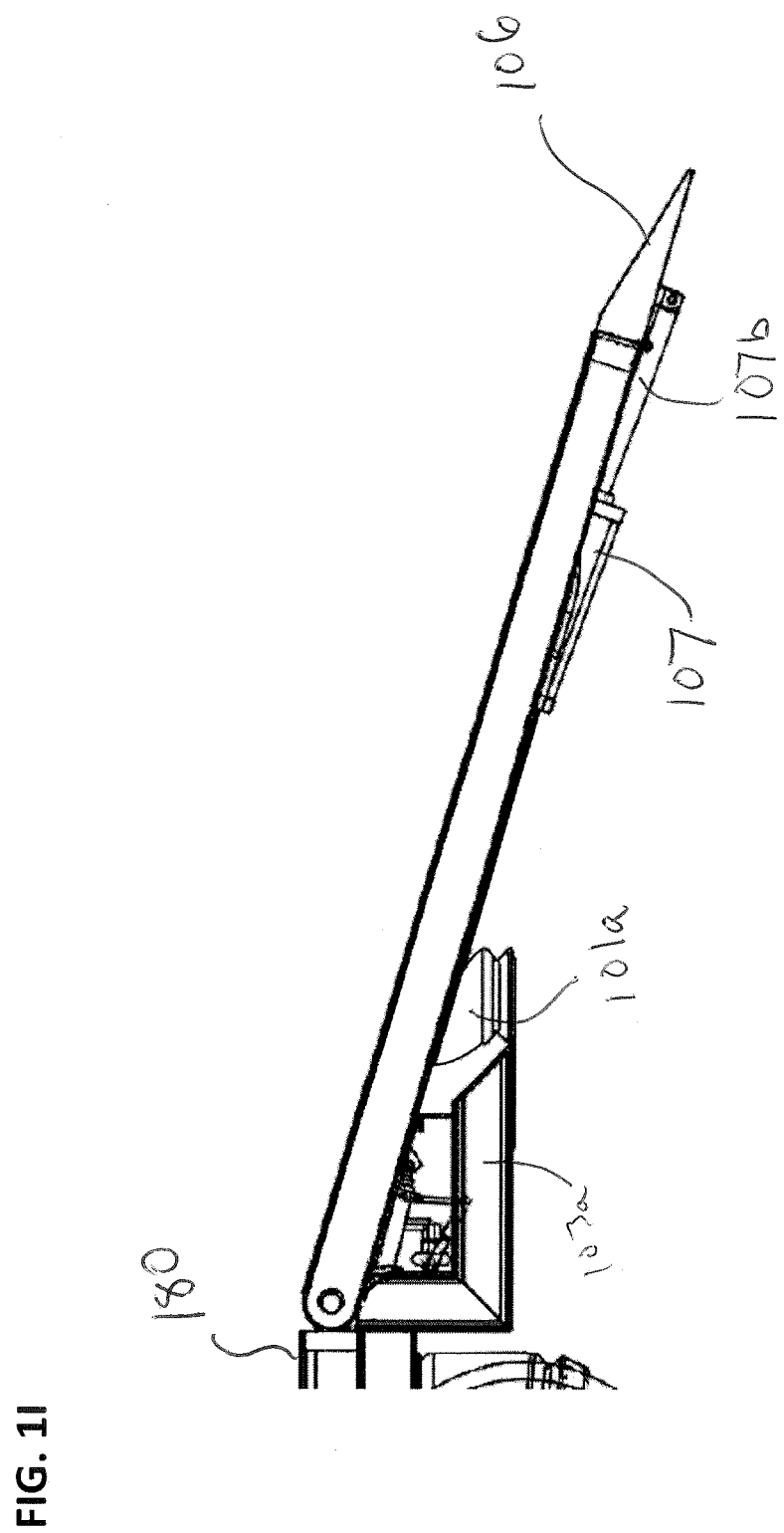
FIG. 1I is a side view of a platform lifting apparatus according to an embodiment of the present invention, showing a platform in a lowered position.
Figure 1J:
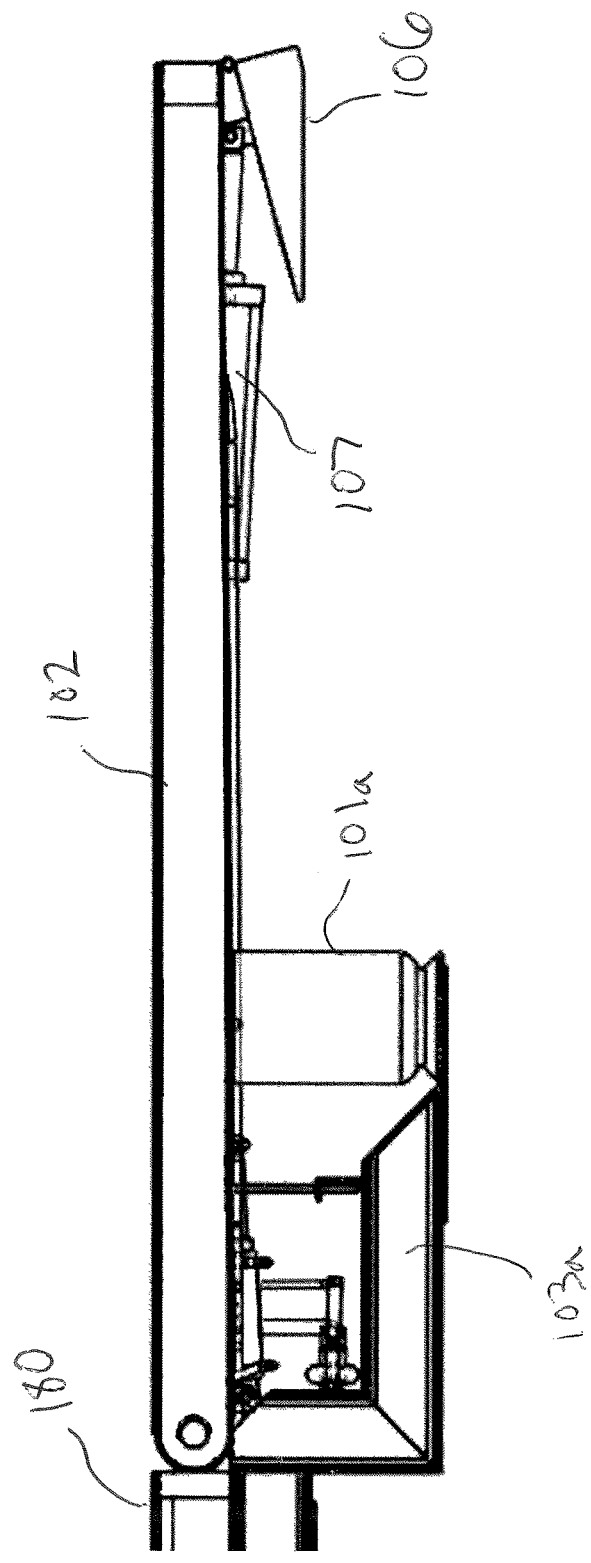
FIG. 1J is a side view of a platform lifting apparatus according to an embodiment of the present invention, showing a platform in a raised position.
Figure 1K:
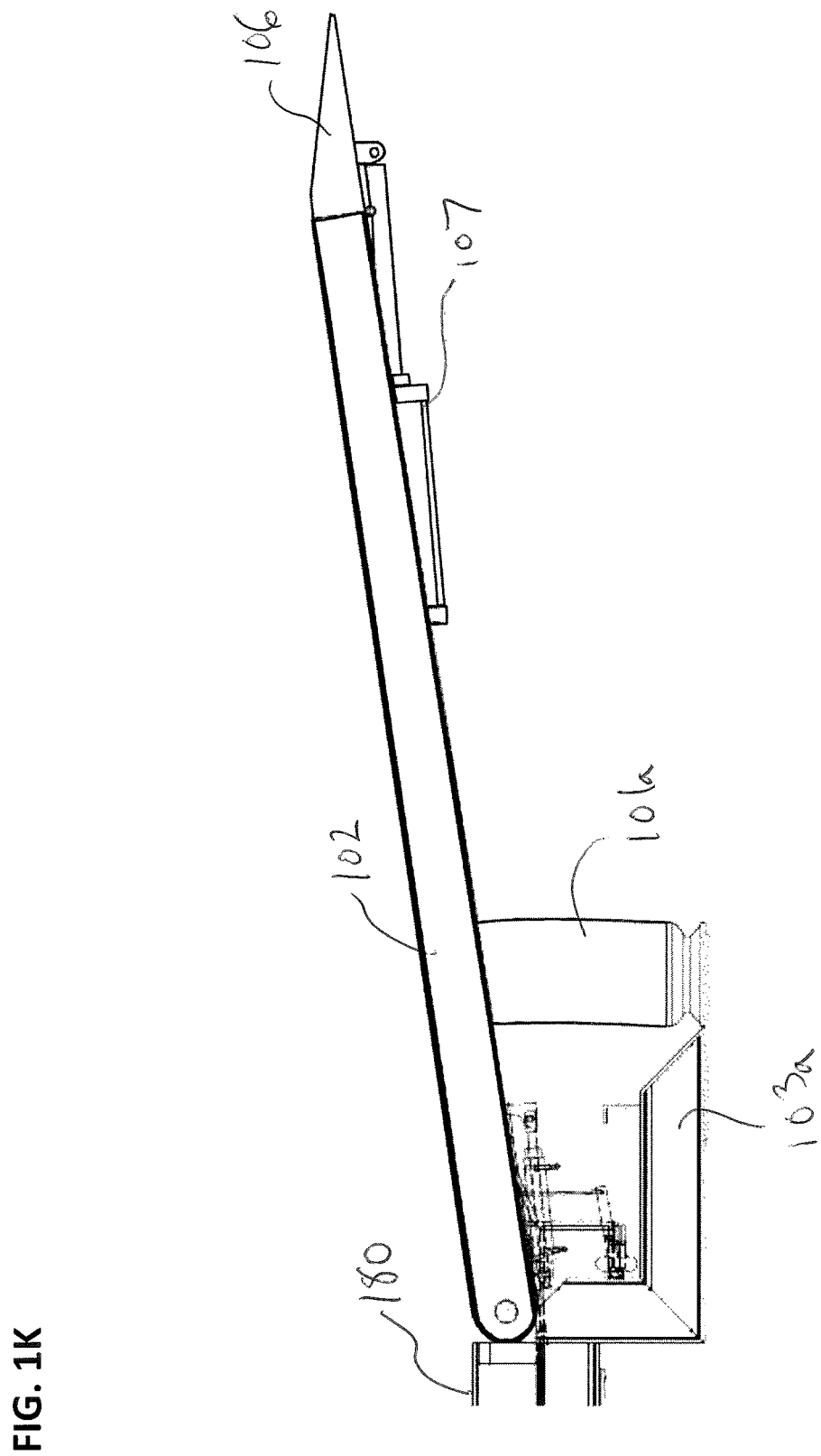
FIG. 1K is a side view of a platform lifting apparatus according to an embodiment of the present invention, showing a platform in a raised position.

Without limiting the scope of the invention, FIGS. 1I-1K illustrate examples of how the platform lifting apparatus 100 may be operated. FIG. 1I shows a side view of the platform lifting apparatus 100 and rear platform 102, where the rear platform 102 is hingedly installed on a truck bed or trailer 180. The rear platform 102 is shown in the lowered position in FIG. 2I, such that the distal ramp is lowered to the ground. A human operator may activate a control valve to allow pressurized air to pass through airbag supply conduit 110 to the airbags 101a and 101b to thereby inflate the airbags. As the airbags 101a and 101b are inflated, they exert upward force on the underside of rear platform 102. FIG. 1J shows the platform 102 in a raised, horizontal position such that the platform 102 is about coplanar with the bed of the truck or trailer 180. This configuration may extend the usable length of the bed of the truck or trailer 180, allowing the truck or trailer 180 to haul a larger or longer load. The airbags in the platform lifting apparatus may each be rated to lift several thousand pounds. For example, and without limitation, each of the airbags may be rated up to 12,000 lbs. Thus, the platform 102 may be lifted with a substantial load thereon.

Figure 2A:
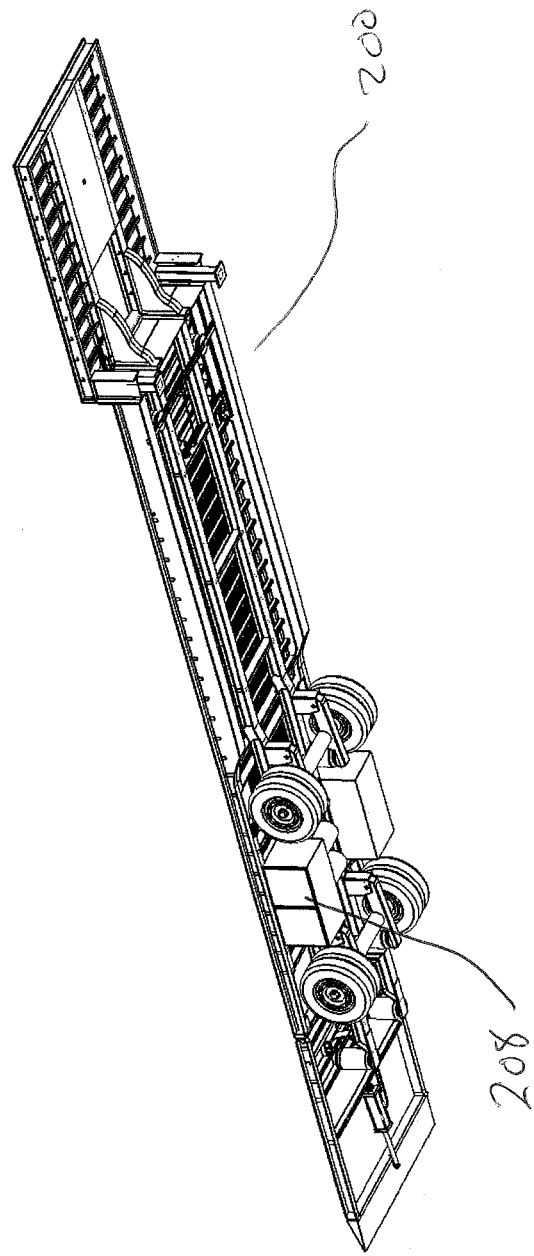
FIG. 2A is a perspective view of a trailer having an integrated fluid-actuated system according an embodiment of the present invention.
Figure 2B:
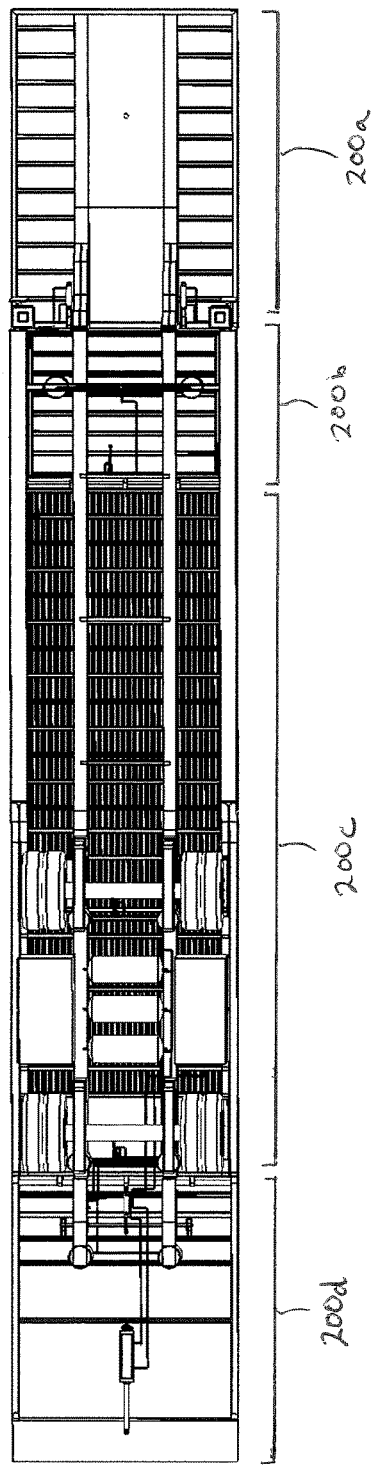
FIG. 2B is a bottom view of a trailer having an integrated fluid-actuated system according an embodiment of the present invention.

Additionally, FIGS. 1I-1J demonstrate the operation of the distal ramp actuator 107. When the platform 102 is lowered into a position contacting the ground, the distal ramp actuator 107 may activated to extend the piston rod 107a to in turn extend the distal ramp 106 to provide a ramp for loading cargo onto the bed of the truck or trailer 180. When the platform 102 is in a raised position as shown in FIG. 2J, the distal ramp actuator may be activated to retract the distal ramp 106, as shown.

In other implementations, and without limitation, the platform 102 may be raised beyond a horizontal position. For example, the platform 102 may be raised to meet an elevated platform such as a loading dock. In such implementations, the airbags 101a and 101b may be inflated (e.g., to max capacity or substantially max capacity) to raise the distal end of the platform 102 above the bed of trailer or truck 180. Also, the distal ramp may be extended to facilitate loading in such implementations.

The platform lifting system of the present invention may be incorporated in to various vehicles and trailer systems. For example, and without limiting the invention, the platform lifting system may be utilized as a rear platform lifting system on a flatbed trailer for changing a position of the rear platform between a lowered position in which the distal end of the platform contacts the ground and a raised position in which the rear platform extends the usable length of the trailer. In other examples, the platform lifting apparatus may be used as a tool for lifting cargo placed on a platform. In still further examples, the platform lifting apparatus may be used to position platforms that are installed in other locations on a vehicle or trailer. For example, and without limitation, see the platform shown in FIGS. 2D-2G and the discussion thereof below.

Integrated Trailer System

Some embodiments of the present invention are drawn to a novel trailer system having multiple integrated systems that are connected to and powered by an air compressor of an attached truck or tractor to which the trailer may be hitched. The integrated air actuated system may include one or both of an air brake and an air suspension system, and one or more platform lifting systems.

The integrated air actuated system of the present invention may include one or more pressure tanks that are charged with pressurized air by an air compressor of an attached truck or tractor and that store pressurized air from the air brake and/or an air suspension system, and the one or more airbags of each of the one or more platform lifting systems. In many embodiments, a check valve is provided on the line between the truck/tractor's air brake system and an embodiment of the present lift system so as to prevent removal of air from the air brake system which could affect operation of that system, unless excess air is available. For example and without limitation, if 95 pounds per square inch (psi) of pressure is needed to effectively operate the truck/tractor's air brake system, then the check valve would only allow air to be introduced into the present lift system embodiment if there is pressure in excess of 95 psi in the air brake system; thus, if the truck/tractor's air brake system was providing only 85 psi, no air would be provided to the lift system. A control system having a control valve may be positioned between the one or more additional pressure tanks and the airbags of the one or more platform lifting systems, allowing a human operator to control the movement of air to the airbags, and thereby control the position of the one or more platforms. In some implementations, and without limitation, the control system may include manual control valves (e.g., push-pull valves) that allow an operator to position the one or more platforms in a desired position. In other implementations, and without limitation, the control system may include a processing unit that is in electronic communication with electronically activated valves that can be controlled by the operator through a user interface (e.g., a touchscreen or keypad). The control system may be inoperable when the truck or tractor is in motion. For example, and without limitation, the control panel may located within a secured box on the trailer that is only accessible when the trailer is parked. In other examples, and without limitation, the control system may include a processing unit that is connected to the air brake system and prevents activation of any of the valves in the air suspension or platform lifting systems once the air brake system is taken out of the parked condition or setting. The inoperability of the platform lifting system (and, in some instances, the air suspension) during movement of the tractor trailer helps to prevent loss of pressurized air from the braking system, which is critical to safety.

In embodiments in which the control system is electronic and includes a processing unit, the processing unit may be capable of activating the control valves of the integrated air actuated system to open or close by sending electronic signals to the control valves. For example, and without limitation, the processing unit may in electronic communication with control valves that include one or more solenoid valves actuators to open and close the valve. The electronically activated control valves may allow an operator to control the valves from a single, conveniently positioned operator interface. Embodiments of the processing unit may be a computer housed within a protected compartment within the trailer, or a remote computer having a wired or wireless connection to the electronics of the control valves. Such a computer may include software capable of commanding the computer to send open and close signals electronically to each of the solenoid valves independently. Such a system may also monitor the pressure available in the truck/tractor's air brake system to only allow air to be removed from that system when the pressure meets or exceeds the pressure required to operate the braking system.

The integrated trailer systems of the present invention may have various designs for hauling various cargoes. For example, and without limitation, the trailer may be a multi-deck car-hauling trailer, a step-deck trailer, a double-deck trailer, or other trailer designs that may benefit from platforms installed therein having an adjustable position. Without limiting the invention, FIG. 2A shows a step-deck style trailer 200 having an integrated air brake, air suspension, and platform lifting system installed therein. As example, and without limitation, such a trailer may have a tandem axle and may have a length in a range of about 48 to about 53 feet. However, the invention is not limited to such trailer specifications. The controls system for the air suspension and platform lifting portions of the integrated system may be housed in a lockable storage box 208 accessible to the operator when the trailer 200 is parked.

The description of the exemplary trailer 200 will be described in portions for the sake of clarity. As shown in FIG. 2B, which provides a bottom view of the trailer 200, the trailer 200 may include an upper deck portion 200a that may be positioned directly behind the cab of a tractor when the trailer is hitched thereto, a front platform 200b having a first platform raising system, a lower deck 200c beneath which the control system and the storage tanks of the integrated air actuated system are located, and a rear platform 200d having a second platform raising system. While the exemplary trailer 200 includes two platforms and two platform lifting systems, the invention is not limited to such a design. The present invention encompasses trailer systems that include various numbers and arrangements of platform lifting systems.

The integrated air-actuated systems of the present invention may connect to the pressurized air supply of a tractor for pulling the trailer. Generally, commercial hauling tractors include a compressor that charges the brakes of the tractor and an attached trailer. The compressor may emit enough pressurized air to be stored in storage tanks in the trailer to power multiple systems, including air brakes on the trailer, an air suspension system on the trailer, and air-actuated platform lifting systems installed in the trailer.

Figure 2C:
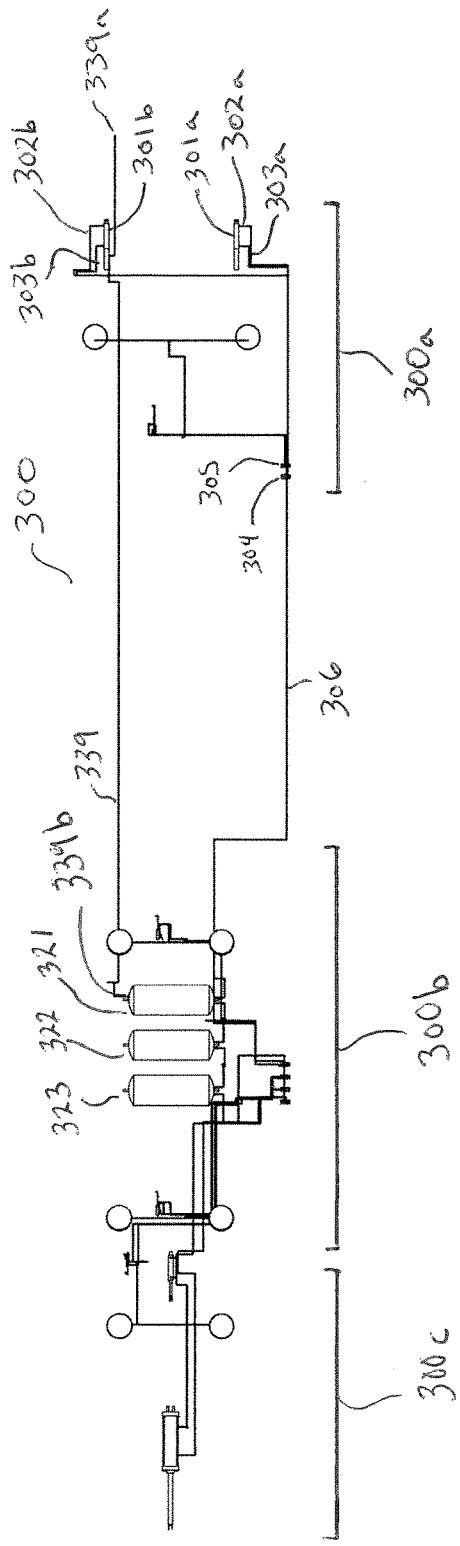
FIG. 2C is a bottom view of an integrated fluid-actuated system according an embodiment of the present invention.
Figure 2D:
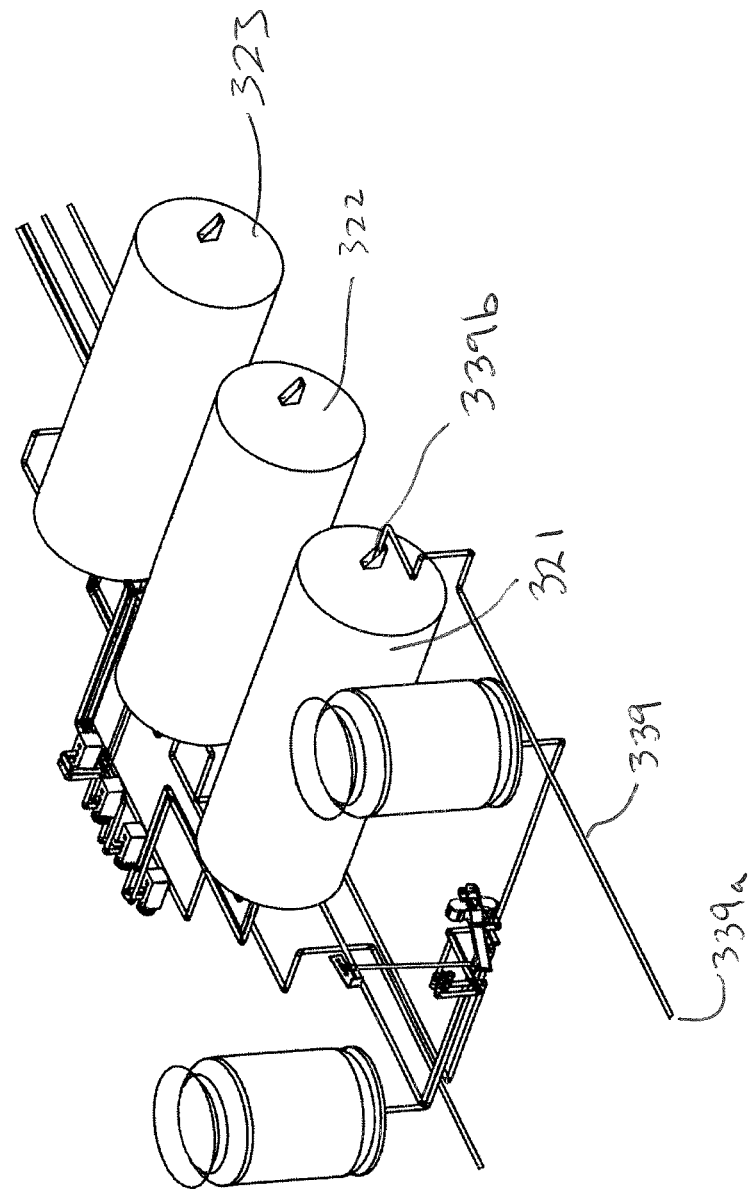
FIG. 2D is a perspective view of a portion of the integrated fluid-actuated system according an embodiment of the present invention

Without limiting the invention, FIG. 2C shows an exemplary integrated air-actuated system 300 of trailer 200. The upper and lower decks 200a and 200c, and the front and rear platforms 200b and 200d are not shown in FIG. 2C for the sake of clarity, although present in the embodiment. The integrated air-actuated system 300 includes an air suspension system and two platform lifting systems. The air braking system is not shown for the sake of clarity. However, an integrated air actuated system that includes an air suspension system, one or more platform lifting systems, and an air brake system is within the scope of the invention. It is to be appreciated that an air braking system may be integrated into the system shown in FIG. 2C. The integrated air actuated system 300 includes an input air conduit 339 having a proximal end 339a that may be coupled to glad handle connectors (not shown) that connect the integrated air actuated system to the air brake system of truck or tractor to which the trailer 200 may be hitched. Such glad hand connectors may connect to the supply and/or service air lines of the truck or tractor, and route the pressurized air provided by the supply and service air lines of the truck or tractor through input air conduit 339. As shown in FIG. 2D, the input air conduit 339 delivers pressurized air to a distal end 339b, which connects to and delivers pressurized air to a first air storage tanks 321 of the integrated air actuated system. The first air tank 321 may supply the air brakes (not shown) with pressurized air.

Figure 2E:
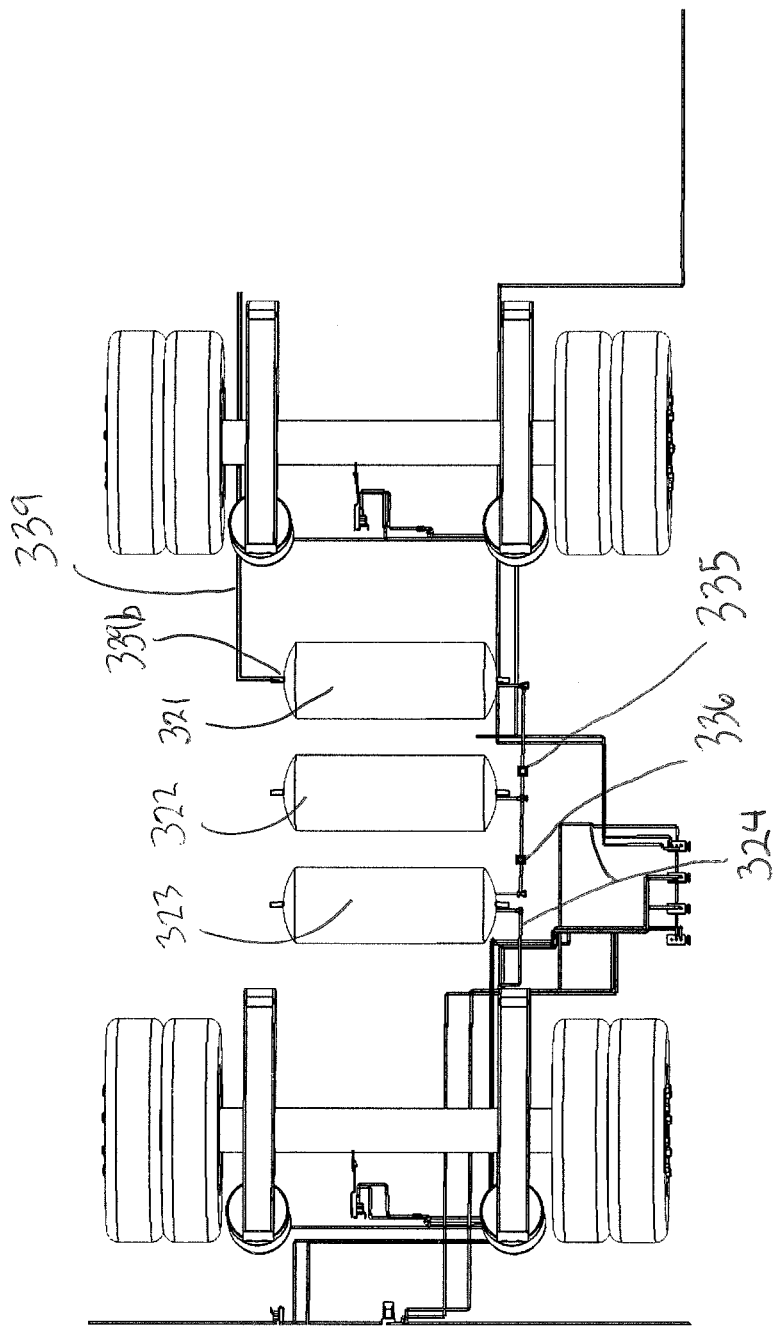
FIG. 2E is a bottom view of a portion of the integrated fluid-actuated system according an embodiment of the present invention

For illustrative purposes, and without limitation, the integrated air-actuated system 300 may be divided into three sections, as shown in FIG. 2C. The first, second, and third air storage tanks 321, 322, and 323 are charged with pressurized air from the compressor of an attached truck or tractor. The air supplied from the tractor through the supply and service brake air line(s) 339 fills the tanks 321, 322, and 323 successively until the pressure in each of the air storage tanks reaches a threshold pressure. The pressure levels in the tanks is controlled by check valves between the tanks and that release only excess air from the storage tanks once a threshold pressure is reached. As an example, and without limitation, the threshold pressure of the check valves for the air storage tanks may be about 95 PSI; thus, unless the pressure supplied from the tractor exceeds 95 PSI, no air will be provided. Referring now to FIG. 2E, and to illustrate how the tanks are filled, the first tank 321 may be connected to the pressurized air supply provided through the air supply conduit 339. The first tank 321 will fill until it reaches the threshold pressure (e.g., 95 PSI) of the first check valve 335 between the first tank 321 and the second tank 322. The second tank will not be filled until the first tank reaches an internal pressure of 95 PSI. The second tank then fills until it reaches 95 PSI, at which point the second check valve 336 between the second tank 322 and the third tank 323 opens and allows the pressurized air to fill the third tank 323. In some embodiments, the first two tanks 321 and 322 may be allotted solely for the trailer brake system to ensure that there is sufficient air pressure to run the braking system during operation of the tractor trailer. The third tank 323 may be connected to integrated air suspension and platform lifting systems through air supply conduit 324. In other embodiments, and without limitation, the first two tanks may be used to service the braking system and the air suspension, and the third tank may be used to service the platform lifting system.

Figure 2F:
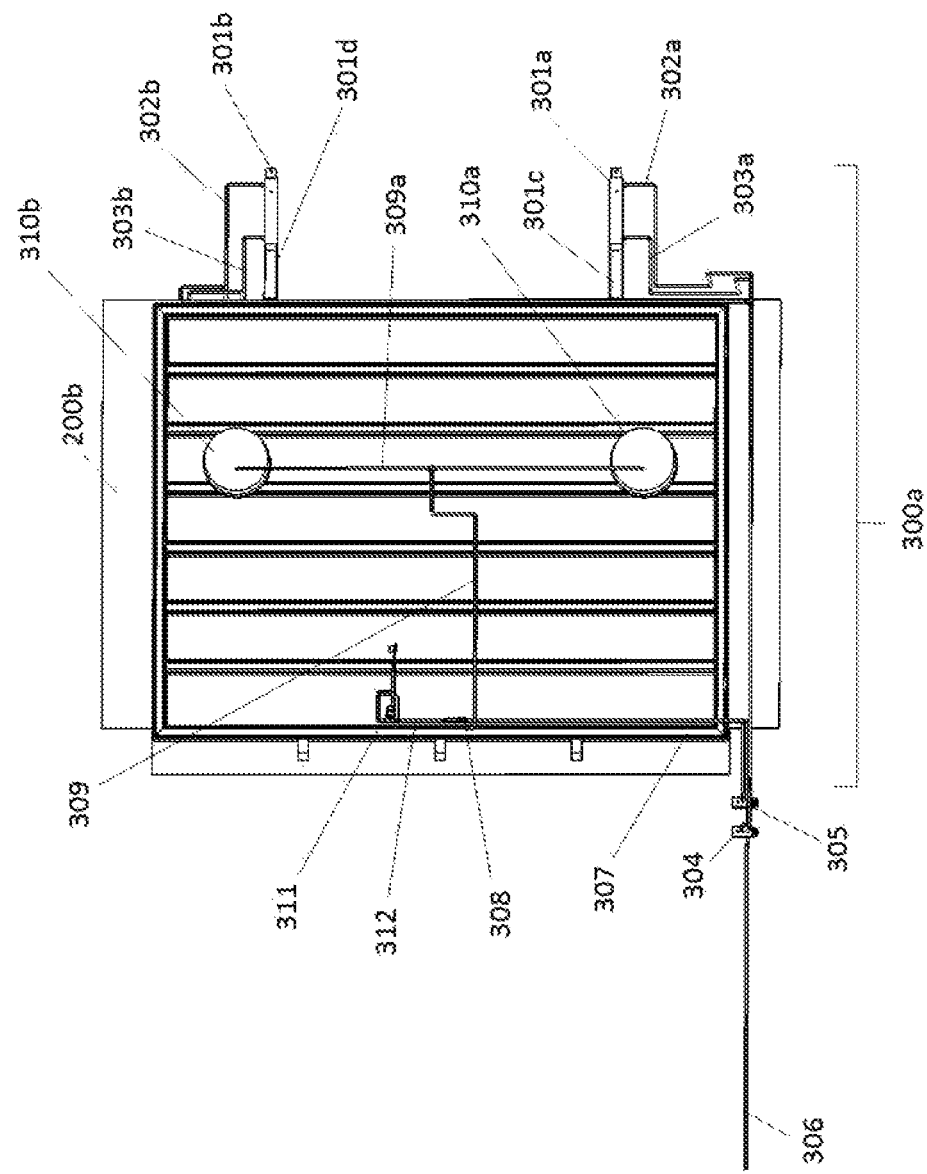
FIG. 2F is a bottom view of a platform lifting system of an integrated fluid-actuated system according an embodiment of the present invention.

Referring to FIG. 2F, and without limiting the invention, the first section 300a includes a conduit system for supplying pressurized air to a platform lifting system of a front platform 200b. Some structures have been omitted from FIG. 2F for clarity of the illustration. As shown in FIGS. 2C and 2F, a front-end air supply conduit 306 may be attached to the third air storage tank 323 and may provide pressurized air to control valves 304 and 305 and the conduit system of first section 300a. Control valve 305 may be connected to an air supply conduit 307 for supplying pressurized air to airbags 310a and 310b. The air supply conduit 307 may be connected to an air conduit coupling manifold 308. An airbag supply conduit 309 may be attached to the coupling manifold 308 such that pressurized air from the supply conduit 307 passes into the airbag supply conduit 309. The airbag supply conduit 309 splits at T-conduit 309a, which directly connects to airbags 310a and 310b. The T-conduit 309a may connect at a connection valve on top plates of the airbags 310a and 310b. In other implementations, the connection valve may be placed at another location on the airbags, such as the bottom plates. A human operator can open the control valve 305 to fill the airbags 310a and 310b to thereby raise the front platform 200b.

Without limiting the invention, the first section 300a may also include a height control valve 311, which may have similar structure and function to those of height control valve 140 shown in FIGS. 1G-1H and discussed herein. The height control valve 311 may be connected to the air conduit coupling manifold 308 by a conduit 312, and thereby may also be connected to the airbag supply conduit 309. The height control valve 311 may be connected to a bottom side of the front platform 200b, and may be calibrated such that when the front platform 200b is lifted to a certain height by airbags 310a and 310b, the height control valve 311 may open. When the height control valve 311 opens, air is released and drawn from the airbags 310a and 310b through the coupling manifold 308 to be released by the height control valve 311, thereby lowering the air volumes within the airbags and the height of the platform.

Figure 2G:
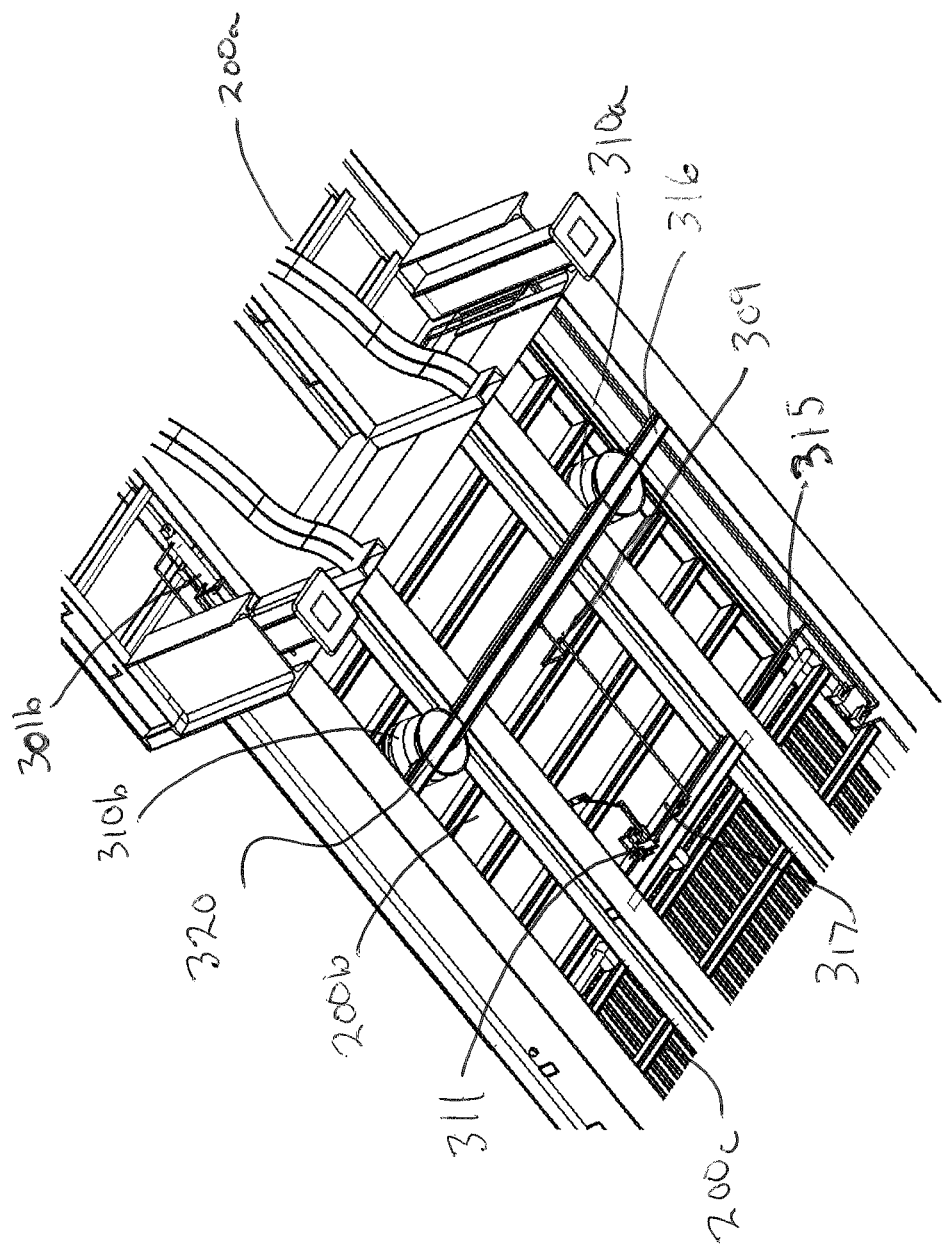
FIG. 2G is a perspective view of a platform lifting system of an integrated fluid-actuated system according an embodiment of the present invention.

Without limiting the invention, FIG. 2G shows a perspective view of the front platform 200b and the first section 300a of the integrated air actuated system. The front platform 200b may be installed in the trailer 200 between the upper deck 200a (a portion of which is shown in FIG. 2G) and the lower deck 200c (a portion of which is shown in FIG. 2G). The front platform 200b may be hingedly attached to the trailer 200 at one end by an axle 315. When the front platform 200b is in a lowered position, the upper surface of front platform 200b may be coplanar with the upper surface of lower deck 200c. The front platform 200b may be pivoted on the axle 315 by a platform lifting apparatus 320 (which may include the airbags 310a and 310b and the associated air supply conduits, a stationary support structure 316, and the height control valve 311 such that the proximal end of the front platform may be lifted to meet and/or be coplanar with the upper surface of the upper deck 200a.

The airbags 310a and 310b may be positioned between a stationary support structure 316 (e.g., a cross beam), and the bottom side of the front platform 200b. The airbags 310a and 310b may each have a base plate anchored to the stationary support structure 316 and a top plate attached to the bottom side of the front platform 200b. The airbags may be placed bilaterally under the front platform 200b, as shown in FIG. 2G. The airbags 310a and 310b and the stationary support structure 316, may be positioned at sufficient distance from the axle 315 such that the airbags may supply sufficient torque to pivot the front platform and lift the proximal end of the platform to meet the upper deck 200a. In some implementations, and without limitation, the front platform may have a length in a range of about 4 to about 10 feet, and the airbags may be positioned a distance from the axle of about 3 to about 7 feet. In one example, and without limitation, the front platform may be about five feet long, and the airbags may be positioned about 3 feet from the axle.

The height control valve of the platform lifting apparatus may be attached to a stationary support member. As shown in FIG. 2G, and without limitation, the height control valve 311 may be attached to a stationary cross beam 317, and thus remains stationary when the front platform 200b is lifted into a raised position by the airbags 310a and 310b. The structure and function of the height control valve 311 is similar to the structure and function of height control valve 140, which is shown in FIGS. 1G-1H and described above. The height control valve may include a lever that is connected to a bar or chain, which is in turn anchored to the bottom side of the front platform. The connection between the bar or chain and the bottom side of the front platform, as well as the connection between the bar or chain and the lever, are pivoting joints that allow the bar to pivot and rotate through the joints as the front platform is lifted. Once the lever is pulled upward by the bar or chain to a threshold point (e.g., corresponding to the platform being raised above the level of the upper deck), the height control valve may open and allow air to escape from the height control valve and thereby lower the level of airbags and the front platform.

The front platform lifting apparatus may also include a platform position locking system for holding the front platform in the raised position once the airbags have lifted the platform to meet the upper deck. The position locking system may include one or more mechanically actuated support members that may be positioned under the platform when the platform is in a raised position. In some embodiments, and without limitation, the support members may be rigid (e.g., metal) beams or bars that are extended (e.g., horizontally or substantially horizontally) under the front platform from the upper deck by a linear actuator to thereby support front platform. In other embodiments, and without limitation, rigid bars may be rotated from the platform to engage the stationary support member on which the airbags are positioned to prop the platform in the raised position.

In further embodiments, the position locking system may include bilateral vertically oriented bars (e.g., curved bars) on the bottom of the platform that include multiple slots therein for receiving a rigid beam or bar extended from one of the mechanically actuated support member. The multiple slots in the vertically oriented bars may allow the platform to be supported at various heights and positions. In other embodiments, the platform system may include a releasable ratcheting system that engages as the platform is lifted. The support provided by the ratcheting system may be released by a manual or electronically engaged release mechanism.

As an example, and without limitation, FIG. 2F shows a position locking system that includes actuators 301a and 301b that include extendable rigid bars (e.g., metal bars) 301c and 301d, respectively. The actuators 301a and 301b may be positioned near the upper deck 200a, such that rigid bars 301c and 301d may hold the front platform 200b in a raised position when the rigid bars 301c and 301d are extended (see, e.g., the position of actuators 301a and 301b in FIG. 2G). The actuators 301a and 301b may be linear dual directional actuators for extending and retracting the extendable rigid bars 301c and 301d, respectively. The actuators 301a and 301b may be supplied with pressurized air through supply conduits 302a, 302b, 303a, and 303b. The control valve 304 may control the passage of pressurized air through conduits 302a, 302b, 303a, and 303b. Control valve 304 may be a two way valve (e.g., a push-pull valve), and may direct pressurized air to different conduit circuits depending on the position of the valve. For example, and without limitation, in a first position (e.g., the push position), the control valve 304 may allow pressurized air to pass through supply conduits 302a and 302b, which connect to proximal chambers in actuators 301a and 301b, respectively. The passage of pressurized air through supply conduits 302a and 302b may result in the extension of the rigid bars 301c and 301d, which may insert beneath and support the front platform 200b when it is in a raised position. Also, in a second position (e.g., the pull condition), the control valve 304 may allow pressurized air to pass through supply conduits 303a and 303b, which connect to distal chambers in actuators 301a and 301b, respectively. The supply of pressurized air to the distal chambers of actuators 301a and 301b may result in the retraction of rigid bars 301c and 301d, thereby allowing the front platform 200b to be lowered from the raised position.

Figure 2H:
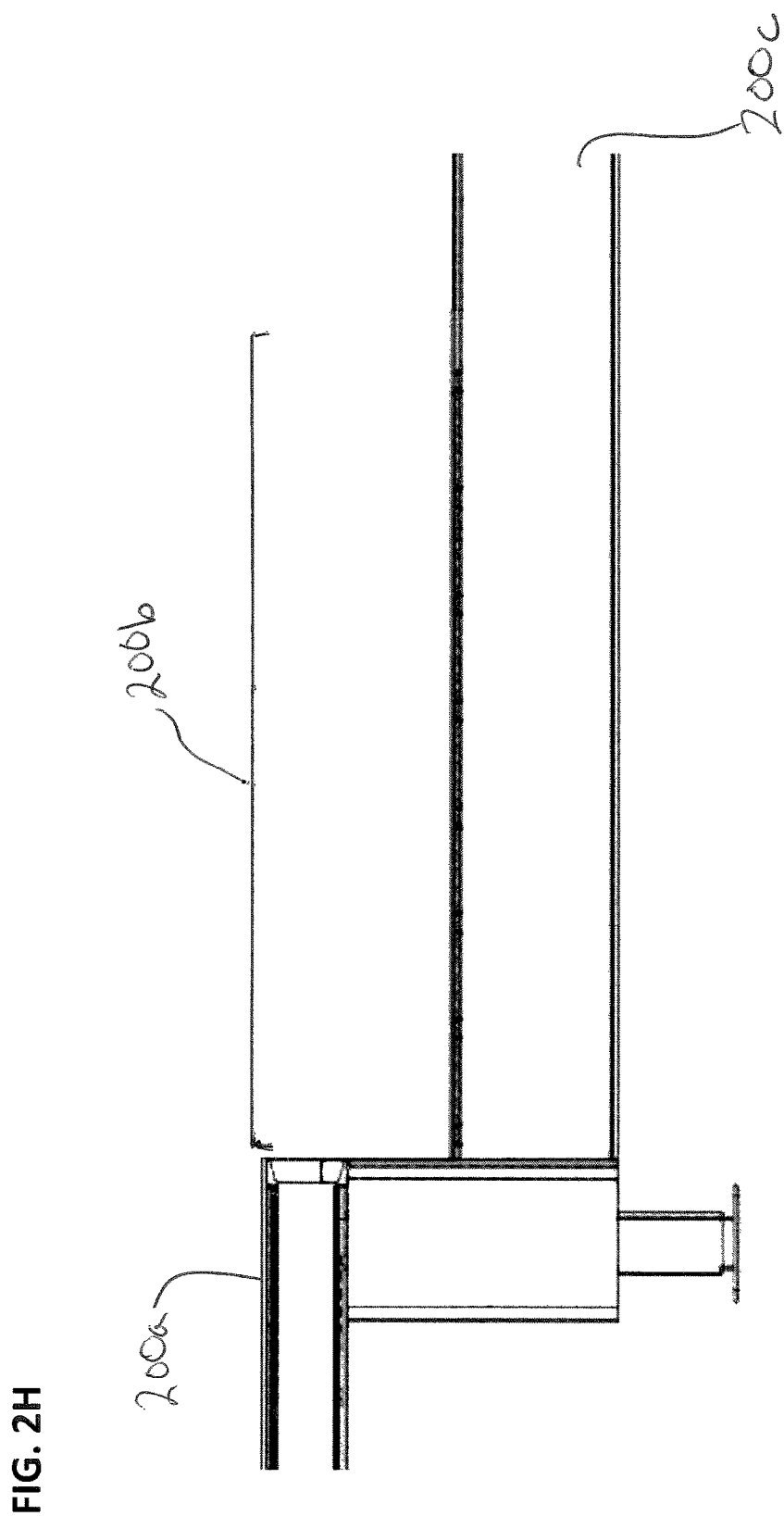
FIG. 2H is a side view of a platform lifting apparatus of an integrated fluid-actuated system according to an embodiment of the present invention, showing a platform in a lowered position.
Figure 21:
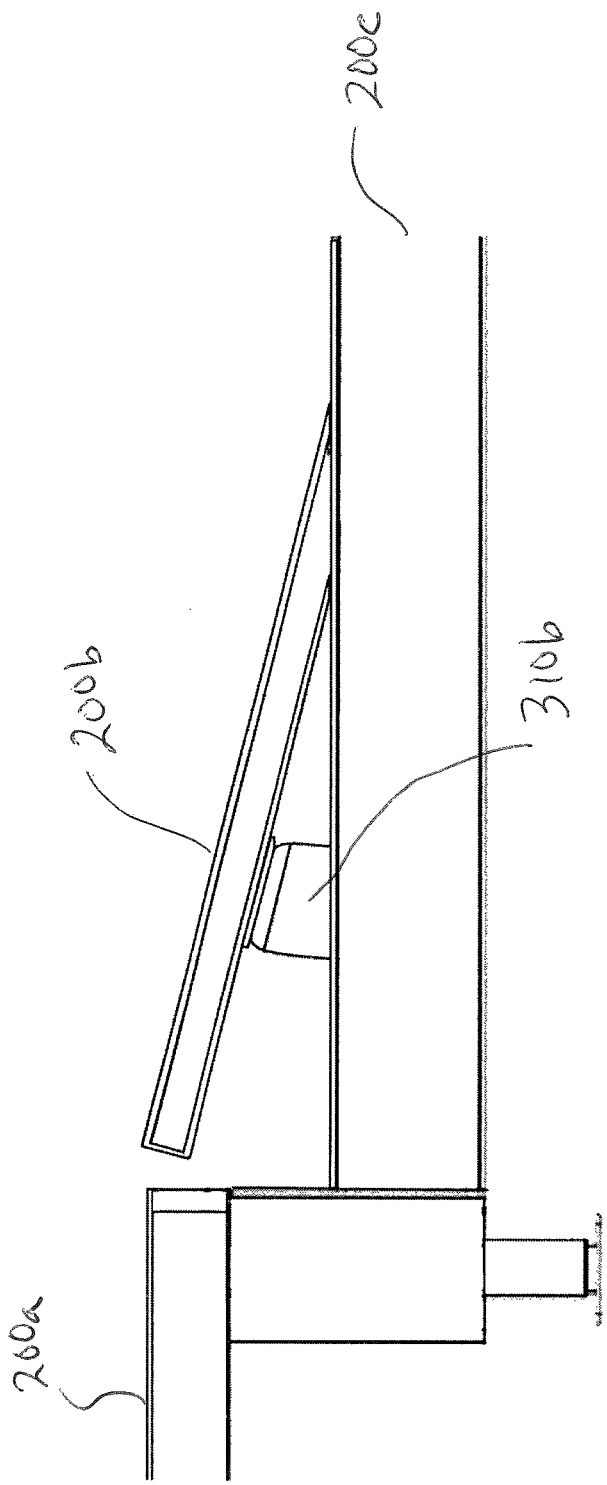
Figure 2J:
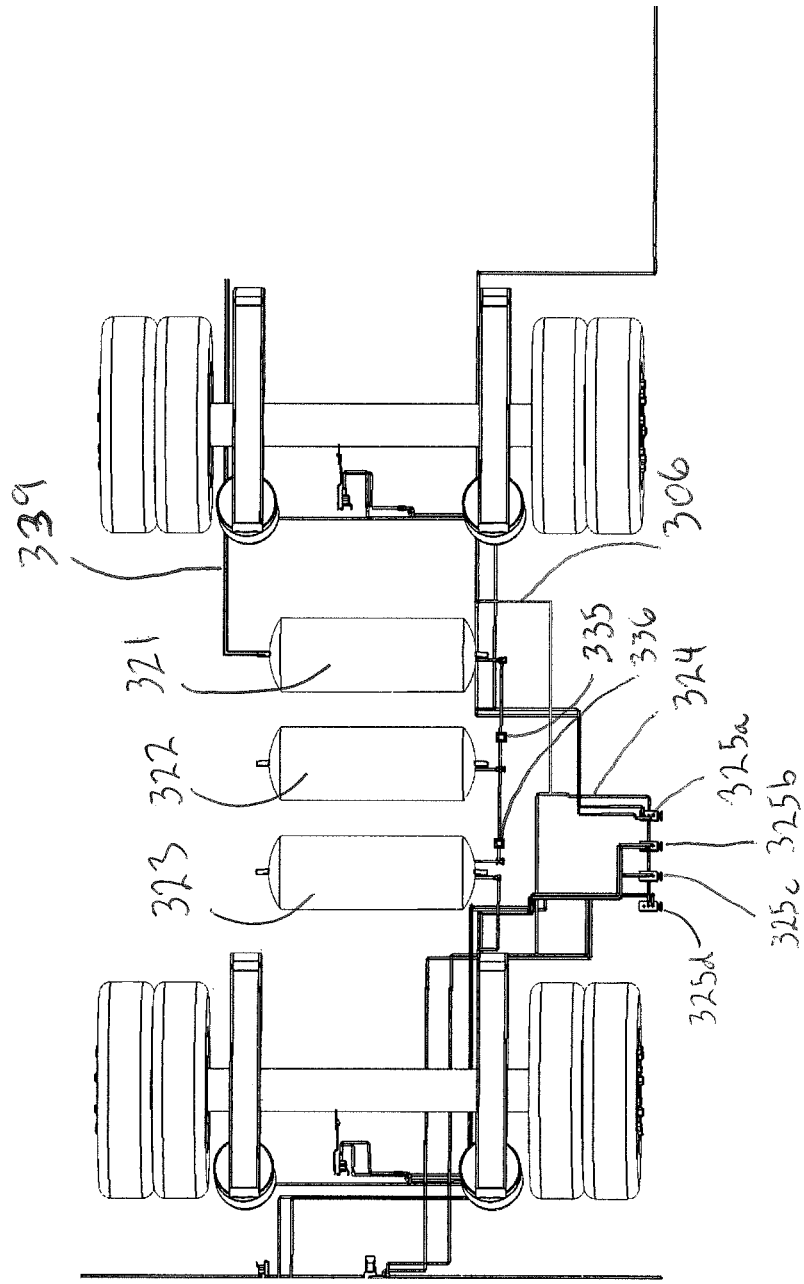
FIG. 2J is a bottom view of an air suspension, a control system, and storage tanks of an integrated fluid-actuated system according an embodiment of the present invention.

Without limiting the scope of the invention, FIGS. 2H-2I provide an illustration of how the platform lifting apparatus 320 and the front platform 200b may be operated. FIG. 2H shows a side view of a portion of trailer 200, which includes the front platform 200b, a portion of the upper deck 200a, and a portion of lower deck 200c. The platform 200b is shown in the lowered position in FIG. 2H, such that the upper surface of front platform 200b is about coplanar with the lower deck 200c. A human operator may activate the control valve 305 to allow pressurized air to pass through airbag supply conduit 309 to the airbags 310a and 310b to thereby inflate the airbags 310a and 310b. As the airbags 310a and 310b are inflated, they exert upward force on the underside of front platform 200b. FIG. 2I shows the platform 200b in the raised position such that the proximal raised end of the front platform 200b is about coplanar with the upper deck 200a. This configuration may allow for a substantially continuous surface from the lower deck 200c to the upper deck 200a, which extends the usable length of the trailer 200. Once the front platform 200b is in the raised position shown in FIG. 2I, the actuators 301a and 301b can be activated to extend the rigid bars 301c and 301d under the platform 200b to thereby support the front platform 200b in the raised position. The airbags in the platform lifting apparatus associated with the front platform may each be rated to lift several thousand pounds. For example, and without limitation, each of the airbags may be rated up to 12,000 lbs. Thus, the front platform may be lifted with a substantial load thereon.

The platform lifting apparatus associated with the front platform may include additional elements that are not shown in FIGS. 2H-2I. For example, and without limitation, the platform lifting apparatus may include a front platform extension to bridge the gap between the front platform and the upper deck when the front platform is in the raised position. Because the front platform pivots on an axle and is rotated upward by the airbags, there may a gap left between the front platform and the upper deck when the front platform is in the raised position. A front platform extension may be present at the raised end of the front platform. For example, a rigid (e.g., metal) platform large enough to reach across and cover the gap between the front platform and the upper deck may be hingedly attached to the proximal end of the front platform or the distal end of the upper deck, such that it can be swung into place over the gap when the front platform is in the raised position. In another example, a single rigid platform may operate as both the platform position locking system and a gap platform for covering the gap between the upper deck and the front platform. The gap platform may be extended (e.g., by linear actuators) from the upper deck into a slot on the raised end of the front platform, and may thereby secure the front platform in the raised position and cover the gap between the front platform and the upper deck.

Referring back to FIG. 2C, the integrated air actuated system 300 includes second section 300b, which includes the air storage tanks, the control system, and the air suspension system of the trailer 200.

Without limiting the invention, FIG. 2J shows a general layout of the second section 200b. Typically, trailers include two storage tanks for providing pressurized air to the air brake and air suspension systems of a trailer. A trailer according to the present invention may include more than two storage tanks to accommodate the added air supply needs of the one or more platform lifting systems. The exemplary system 300 depicted in the figures includes three storage tanks. Each of storage tanks 321, 322, and 323 may have one way check valves (e.g., 335, 336) that sets a maximum pressure that can be reached in the tank ("cut-out" pressure). The first two tanks 321 and 322 may be allotted to run the air brake system of the trailer 200. The third air tank 323 may be connected by air supply conduit 324 to a series of control valves that control the movement of pressurized air from the third tank 323 to various components within the second section 300b. The first two control valves 325a and 325b control the movement of pressurized air to the air suspension system of the trailer 200. In other embodiments, the first two tanks 321 and 322 may service the air brake and air suspension systems of the trailer, and the third air tank 323 may service the platform lifting systems.

Figure 2K:
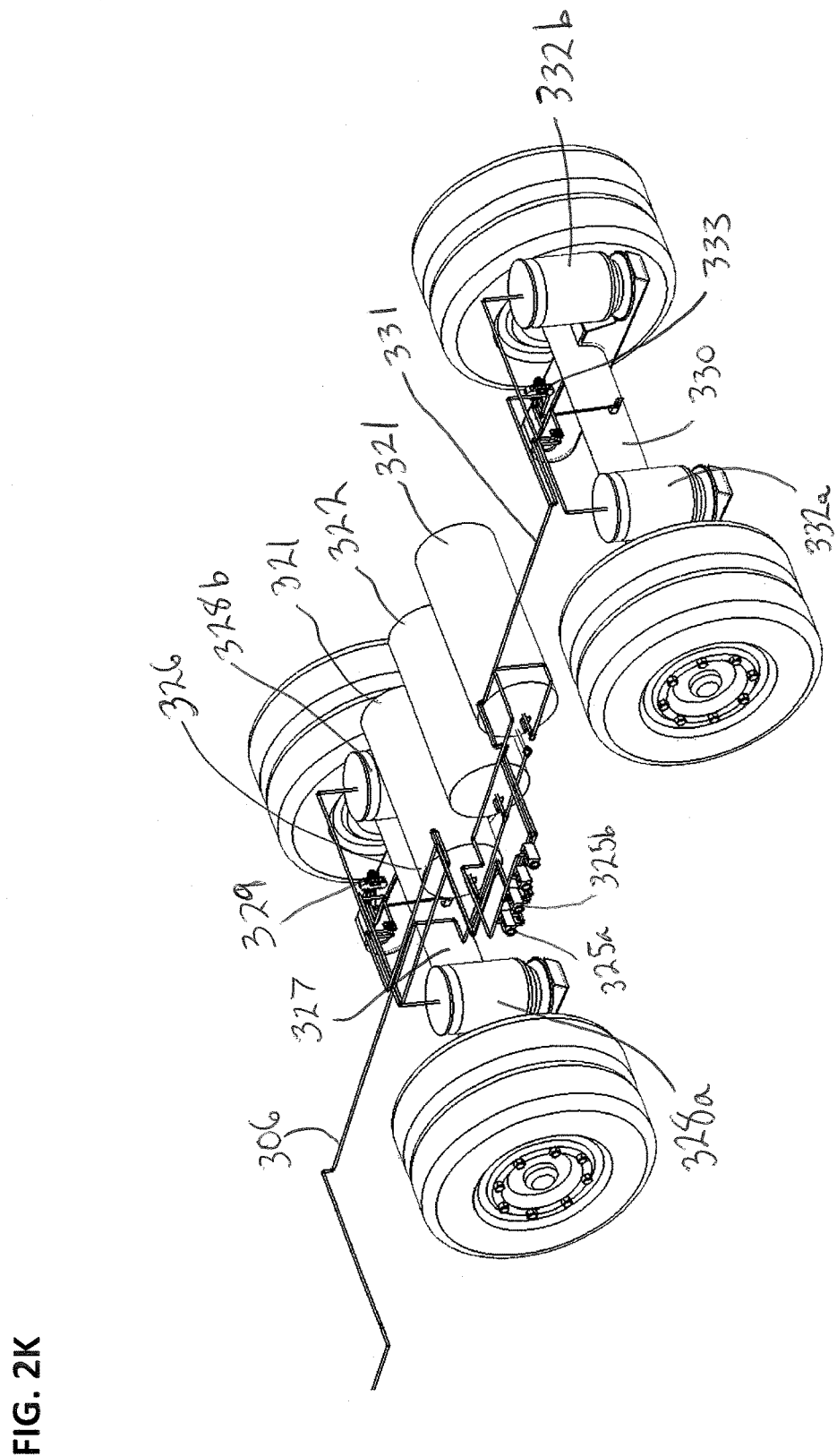
FIG. 2K is a perspective view of an air suspension, a control system, and storage tanks of an integrated fluid-actuated system according an embodiment of the present invention, emphasizing the air suspension system.

Without limiting the invention, FIG. 2K shows the air suspension system of the trailer 200, including the control valves 325a and 325b and the associated conduit systems. Several structures have been omitted from the drawing for clarity of the illustration, although present. The first control valve 325a services the air suspension for a first axle 327. A supply air conduit 326 (which includes a "T" conduit 326a) connects the first control valve 325a to first and second air springs 328a and 328b, which are each positioned between a trailing arm and the bottom of the lower deck 200c. A height control valve 329 may be connected with the air conduit 326 through a connector, and may function to regulate the height that the lower deck may be lifted above the axle 327. The height control valve may be similar in structure and function to height control valves 140 and 311, which are discussed above.

FIG. 2K also shows a second control valve 325b, which services the air suspension for a second axle 330. An air supply conduit 331 (which includes a "T" conduit 331a) connects the second control valve 325b to third and fourth air springs 332a and 332b, which are each positioned between a trailing arm and the bottom of the lower deck 200c. A height control valve 333 may be connected with the air supply conduit 331 through a connector, and may function to regulate the height that the lower deck may be lifted above the axle 330. The height control valve 333 may be similar in structure and function to height control valves 140 and 311, which are discussed above.

The air suspension system of the integrated air-actuated system may be operable to adjust a height of the trailer relative to the ground. For example, and without limitation, the air suspension system may be operable to move the lower deck to a loading height by releasing the air from the air springs 328a, 328b, 332a, and 332b. The air suspension system may also be operable to raise the lower deck to a ride height by inflating the air springs 328a, 328b, 332a, and 332b. For example, and without limitation, the air suspension system may be operable to vary the height of the lower deck 200c from a loading height of about 30 inches to a ride height of about 36 inches. The inflation and deflation of the air springs 328a, 328b, 332a, and 332b may be controlled by a human operator by manually operating the control valves 325a and 325b. The control valves 325a and 325b may each have a charging position (e.g. the "push" position) in which pressurized air is allowed to flow from the third storage tank 323 into the air springs, and a discharging position (e.g., the "pull" position) in which air is released from the air springs.

Referring back to FIG. 2J, the integrated air actuated system includes a rear platform actuating system that is similar to rear platform actuating system 100 discussed above. A portion of the integrated air-actuated system services the rear platform lifting system. Control valves 325c may control the supply of pressurized air to air bags for lifting rear platform 200d. Control valve 325d may control the supply of pressurized air to a locking system actuator for positioning an axle and locking bars of a position locking system and to a distal ramp actuator for positioning a distal ramp at the distal end of the rear platform 200d.

Figure 2L:
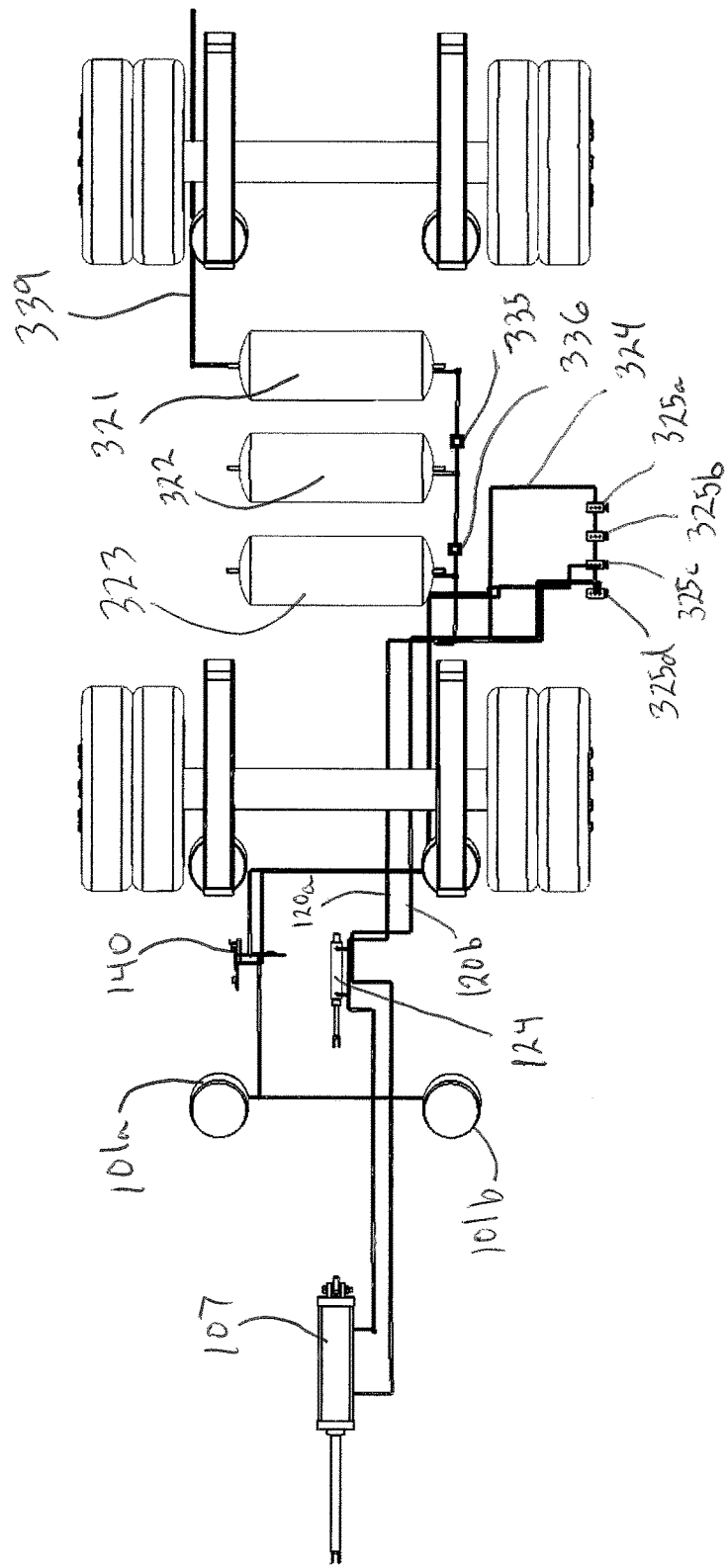
FIG. 2L is a bottom view of an air suspension, a control system, storage tanks, and a rear platform lifting system of an integrated fluid-actuated system according an embodiment of the present invention, emphasizing the rear platform lifting system.

Without limiting the invention, FIG. 2L shows the connections between the control valves 325c and 325d and the air-actuated structures of a rear platform lifting system. Several structures have been omitted from the drawing for clarity of the illustration. Also, reference numbers from FIGS. 1A-1H are incorporated into FIG. 2L because several of the structures in FIG. 2L (those that are part of the rear platform lifting system) are similar to those in FIGS. 1A-1H. The third control valve 325c may service the airbags 101a and 101b. Airbag supply conduit 110 (which includes a T conduit 110a) connects the third control valve 325c to air bags 101a and 101b, which are each positioned between a stationary support member (e.g., stationary support members 103a and 103b) and a bottom side of rear platform 200d. A height control valve 140 may be connected with the airbag supply conduit 140 through a connector (as discussed above with regard to FIGS. 1G-1H), and may function to regulate the height to which the rear platform 200d may be lifted.

FIG. 2L also shows a fourth control valve 325d, which services the distal ramp actuator 107 and the locking mechanism actuator 124. Actuator supply conduits 120a and 120b connect control valve 325d to both the distal ramp actuator 107 and the locking mechanism actuator 124, and may supply pressurized air to (1) the linear actuator 107 for positioning the distal ramp 106 and (2) the locking mechanism actuator 124 for positioning axle 121 and locking bars 122a and 122b such that the slots in the locking bars 122a and 122b may engage with the support brackets 103c and 103d.

The distal ramp actuator 107 and the locking mechanism actuator 124 may be linear dual directional actuators that can both extend and retract a piston rod. Thus, both actuator supply conduits 120a and 120b connect with each of the distal ramp actuator 107 and locking mechanism actuator 124 to thereby supply each of the air chambers therein. The dual directional operability of the distal ramp actuator 107 allows it to extend and retract the distal ramp 106, and the dual directional operability of the locking system actuator 124 allows it to rotate the locking bars 122a and 122b into both a locking position and a retracted position.

Further discussion of the rear platform lifting system is not necessary because the system shown in FIG. 2L is substantially the same as the platform lifting system 100 discussed with regard to FIGS. 1A-1J. Additionally, the rear platform lifting system shown in FIG. 2L is connected to rear platform 200d in substantially the same way rear platform lifting system 100 is connected to rear platform 102.

In use, an exemplary embodiment of an integrated system of the present invention may include a detachable trailer attached to a motorized truck or tractor with air compressor. The air compressor is connected to an air system of the trailer which may include (a) an air brake system, and/or (b) an air suspension system, and/or (c) an air operated platform lifting system. In such an exemplary embodiment at least one (and preferably two) air storage tanks 321, 322 are provided for operating the air brake and/or air suspension system of the trailer. An additional storage tank 323 is provided for operating the platform lifting system. A check valve 335 is provided between tanks 321 and 322 to prevent loss of pressure to the brake/suspension system in the event of a failure or leak in tank 322; and another check valve 336 is provided between tanks 322 and 323 to similarly prevent loss of pressure to the brake/suspension system in the event of a failure or leak in tank 323.

As the truck/tractor and trailer (vehicle) of the exemplary system are in motion on a road, the air compressor provides pressurized air to tanks 321 and 322 which are used in real time to operate the brakes and/or suspension of the vehicle while in motion. So long as the available air pressure meets a minimum threshold (e.g. 95 PSI) for operating the brakes and/or suspension system, any additional air pressure is provided to and stored in the third tank 323 for later use. Then, when the vehicle is stopped, the pressure in tanks 321 and 322 is ordinarily released, leaving pressure only in tank 323; although in some embodiments pressure may be kept in all three thanks to make them all available.

After the vehicle of the exemplary embodiment is stopped, a user may operate control valve 325c to provide air to airbags 101 in order to raise or lower platform 102 using pressure from tank 323, and potentially also from tanks 321 and 322. If the air pressure is lost, exhausted, or if tank 323 was not charged during operation of the vehicle (e.g., the air pressure did not exceed the threshold), the compressor of the truck/tractor may be started in order to charge the tank(s) so that lifting operations may continue. Actuator 107, if provided, may also be operated to move ramp 106 using pressurized air from the same tanks.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed:

1. An integrated trailer suspension and platform lifting system for a trailer comprising:
   a. at least one platform airbag storage tank receives pressurized air from an air brake or air suspension system of said trailer;
   b. a control valve connected to said at least one platform airbag storage tank;
   c. a conduit having a proximal end connected to said control valve; and
   d. at least one airbag for lifting a rear platform, said at least one airbag is connected to a distal end of said conduit, and positioned under said rear platform, wherein said at least one airbag is operable to pivot and raise said rear platform without assistance from additional lifting devices.

2. The apparatus of claim 1, wherein a proximal end of said rear platform is hingedly attached to a distal end of a deck of said trailer such that said rear platform pivots as the at least one airbag inflates or deflates and a distal end of the rear platform can be lowered to meet the ground when the trailer is on substantially flat, horizontal ground.

3. The apparatus of claim 1, further comprising a position locking system for holding said rear platform at one of multiple positions relative to said deck of said trailer, including positions in which said rear platform is angled below said deck, and positions in which said rear platform is angled above said deck, wherein said locking system is operable to support the weight of said rear platform without support form said at least one airbag.

4. The apparatus of claim 1, wherein said at least one platform airbag is positioned under said rear platform at about 3 to about 7 feet from a distal end of said trailer.

5. The apparatus of claim 1, further comprising at least two storage tanks for storing a pressurized fluid, at least one connecting conduit provided in series between each of said tanks, and a check valve provided on each connecting conduit.

6. The apparatus of claim 5, wherein the last of said series of fluid storage tanks is connected to said conduit, and another of said fluid storage tanks is connected to an air brake system of said vehicle or trailer.

7. The apparatus of claim 1, wherein said pressurized air received in said at least one platform airbag storage tank is prevented from backflowing into said air brake or air suspension system of said system.

8. The apparatus of claim 1, wherein said apparatus is operable to lift said rear platform with a load of up to about 12,000 lbs.

9. The apparatus of claim 1, further comprising a second platform and at least one second platform airbag for positioning said second platform, said second platform being located at a front end of said trailer, and said at least one second platform airbag being connected to said source of pressurized fluid via a second control valve.

10. The apparatus of claim 9, further comprising a second conduit, said second conduit having a proximal end connected to said second control valve, and a distal end connected to said at least one second platform airbag.

11. The apparatus of claim 1, wherein said at least one platform airbag includes two platform airbags and said two platform airbags are operable to pivot and raise the entire weight of the rear platform.

12. The apparatus of claim 1, wherein said at least one platform airbag receives pressurized air from an air brake or air suspension system when a pressure in said air brake or air suspension system exceeds a pre-determined threshold.

13. An integrated trailer suspension and platform lifting system for a trailer comprising:
   a. at least one platform airbag storage tank for storing a pressurized fluid, wherein said platform airbag storage tank receives pressurized air from an air brake or suspension system of said integrated system, and said platform airbag storage tank does not supply pressurized air to airbrakes or air suspension in said integrated system;
   b. a delivery conduit attached at a first end to said air brake or suspension system and having a second end that supplies air to said at least one platform airbag storage tank;
   c. at least one first platform airbag connected to said at least one platform airbag storage tank by a first platform airbag conduit, wherein said at least one first platform airbag is positioned under a first lifting platform hingedly attached to a distal end of said trailer such that said platform pivots as the at least one airbag inflates or deflates, wherein said at least one first platform airbag is operable to pivot and raise said first platform without assistance from additional lifting devices; and
   d. a control valve for controlling the flow of a pressurized fluid from said at least one platform airbag storage tank to said at least one first platform airbag.

14. The system of claim 13, further comprising a second platform and at least one second platform airbag for lifting said second platform of said trailer, said second platform being located at a front end of said trailer, and said at least one second platform connected to said delivery conduit system by a second control valve.

15. The system of claim 14, further comprising a control unit for operating said control valve and said second control valve, said control unit being operable to open and close said control valve and said second control valve.

16. The trailer of claim 14, wherein said trailer has an upper front-end deck and a lower deck, and a pivoting end of said second platform lies on a same substantially horizontal plane as the lower deck.

17. The trailer of claim 16, wherein said at least one second platform airbag is operable to rotate said second platform on said pivoting end and raise a swinging end of said second platform, said swinging end being opposite to said pivoting end of said second platform.

18. The system of claim 13, wherein said at least one platform airbag includes two platform airbags and said two platform airbags are operable to pivot and raise the entire weight of the lifting platform.

19. The system of claim 13, wherein said at least one platform airbag receives pressurized air from an air brake or air suspension system when a pressure in said air brake or air suspension system exceeds a pre-determined threshold.

20. An integrated trailer suspension and platform lifting system for a trailer comprising:
   a. at least one air bag storage tank for storing a pressurized fluid, wherein said at least one storage tank receives pressurized fluid from an air brake or suspension system of a trailer, and said at least one air bag storage tank does not supply pressurized fluid to said air brake or suspension system;
   b. a delivery conduit attached at a first end to an extrinsic said air brake or suspension system and having a second end that supplies air to said at least one air bag storage tank;
   c. a rear platform pivotally attached to a rear end of said trailer; and
   d. at least one rear platform airbag for lifting said rear platform of said trailer, said at least one rear platform airbag connected to said at least one platform airbag storage tank by a rear platform conduit, and said at least one rear platform airbag is positioned under said rear platform, wherein said at least one rear platform airbag operable to pivot and raise the entire weight of the rear platform.

21. The trailer of claim 20, wherein said rear platform pivots as the at least one rear platform airbag inflates or deflates, such that when the trailer is on substantially flat, horizontal ground, the distal end of the rear platform can be lowered to meet the ground.

22. The trailer of claim 20, further comprising a locking mechanism for holding the rear platform in a pre-determined position after the at least one rear platform airbag moves said rear platform to said pre-determined position.

23. The trailer of claim 20, further comprising a control unit for operating a control valve for controlling the flow of a pressurized fluid from said at least one storage tank to said at least one airbag, said control unit being operable to open and close said control valve.

24. The trailer of claim 20, further comprising a second platform, said second platform being located at a front end of said trailer.

25. The trailer of claim 24, further comprising at least one second platform airbag for lifting said second platform, said at least one second platform airbag connected to said delivery conduit system by a second control valve.

26. The trailer of claim 25, further comprising a control unit for operating said control valve and said second control valve, said control unit being operable to open and close said control valve and said second control valve.

27. The trailer of claim 24, wherein said trailer is has an upper front-end deck and a lower deck, and a pivoting end of said second platform lies on a same substantially horizontal plane as the lower deck.

28. The trailer of claim 17, wherein said at least one second platform airbag is operable to rotate said second platform on said pivoting end and raise a swinging end of said second platform, said swinging end being opposite to said pivoting end of said second platform.

29. The trailer of claim 28, wherein said at least one second platform airbag is operable to raise said swinging end of said second platform to meet a distal end of said upper deck, thereby positioning said second platform as a ramp between said lower deck and said upper front-end deck.

30. The trailer of claim 20, further comprising a rear platform ramp hingedly attached to a distal end of said rear platform, and an actuator for pivoting said rear platform ramp with respect to said rear platform.

31. The apparatus of claim 20, further comprising at least two storage tanks for storing a pressurized fluid, at least one connecting conduit provided in series between each of said tanks, and a check valve provided on each connecting conduit.

32. The apparatus of claim 31, wherein the last of said series of fluid storage tanks is connected to said conduit, and another of said fluid storage tanks is connected to an air brake system of said vehicle or trailer.

33. The system of claim 20, wherein said at least one platform airbag includes two platform airbags and said two platform airbags are operable to pivot and raise the entire weight of the rear platform.

34. The system of claim 20, wherein said at least one platform airbag receives pressurized air from an air brake or air suspension system when a pressure in said air brake or air suspension system exceeds a pre-determined threshold.

* * * * *